(12) United States Patent
Chang

(10) Patent No.: US 9,823,768 B2
(45) Date of Patent: Nov. 21, 2017

(54) SIGNAL MEASURING METHOD AND DEVICE FOR TOUCH SCREEN

(71) Applicant: EGALAX_EMPIA TECHNOLOGY INC., Taipei (TW)

(72) Inventor: Chin-Fu Chang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 104 days.

(21) Appl. No.: 13/896,423

(22) Filed: May 17, 2013

(65) Prior Publication Data

US 2013/0321330 A1 Dec. 5, 2013

Related U.S. Application Data

(63) Continuation-in-part of application No. 13/545,291, filed on Jul. 10, 2012.

(60) Provisional application No. 61/676,354, filed on Jul. 27, 2012, provisional application No. 61/648,710, filed on May 18, 2012.

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
CPC .................. G06F 3/0416; G06F 3/044; G06F 2203/04112
USPC .......................................................... 345/173
See application file for complete search history.

(56) References Cited

U.S. PATENT DOCUMENTS

| | | | |
|---|---|---|---|
| 2008/0157867 A1* | 7/2008 | Krah | G06F 3/044 329/304 |
| 2008/0158174 A1 | 7/2008 | Land et al. | |
| 2010/0066692 A1 | 3/2010 | Noguchi et al. | |
| 2010/0244036 A1 | 9/2010 | Park et al. | |
| 2010/0302198 A1 | 12/2010 | Tasher et al. | |
| 2011/0084924 A1 | 4/2011 | Chang et al. | |
| 2011/0095991 A1* | 4/2011 | Philipp et al. | 345/173 |
| 2012/0113045 A1* | 5/2012 | Lai | G06F 3/0416 345/174 |
| 2012/0194476 A1 | 8/2012 | Lee et al. | |
| 2012/0287081 A1* | 11/2012 | Akai et al. | 345/174 |
| 2013/0009906 A1 | 1/2013 | Posamentier | |
| 2013/0100069 A1* | 4/2013 | Kwon | G06F 3/044 345/174 |
| 2013/0120310 A1 | 5/2013 | Siska | |
| 2013/0293491 A1* | 11/2013 | Doi | G06F 3/044 345/173 |
| 2013/0307814 A1 | 11/2013 | Chang | |

FOREIGN PATENT DOCUMENTS

| | | | | |
|---|---|---|---|---|
| JP | 2013231932 | * | 5/2012 | .......... G06F 3/0412 |
| TW | 201036171 | | 2/2010 | |

(Continued)

*Primary Examiner* — Nelson Rosario
*Assistant Examiner* — Chun-Nan Lin
(74) *Attorney, Agent, or Firm* — WPAT, PC

(57) ABSTRACT

Each one or each set of driving electrodes of a touch screen corresponds to a delay phase difference. Whenever a driving signal is provided to one or a set of the driving electrodes, a signal on at least one of sensing electrodes of the touch screen is measured after being delayed by the delay phase difference corresponding to the one or the set of the driving electrodes being provided with the driving signal.

20 Claims, 11 Drawing Sheets

(56) References Cited

FOREIGN PATENT DOCUMENTS

TW          201113775     4/2011
TW          201115444     5/2011

\* cited by examiner

```
┌─────────────────────────────────────────────────────────────┐
│ PROVIDING A CAPACITIVE TOUCH SCREEN INCLUDING A PLURALITY OF│
│ DRIVING ELECTRODES ARRANGED IN PARALLEL AND A PLURALITY OF  │
│      SENSING ELECTRODES ARRANGED IN PARALLEL                │
│                         1010                                │
└─────────────────────────────────────────────────────────────┘
                              │
                              ▼
┌─────────────────────────────────────────────────────────────┐
│ DETERMINING A DELAY PHASE DIFFERENCE FOR EACH ONE OR EACH   │
│                SET OF DRIVING ELECTRODES                    │
│                         1020                                │
└─────────────────────────────────────────────────────────────┘
                              │
                              ▼
┌─────────────────────────────────────────────────────────────┐
│ SEQUENTIALLY PROVIDING A DRIVING SIGNAL TO EACH ONE OR EACH │
│   SET OF THE DRIVING ELECTRODES, THE DRIVING ELECTRODES     │
│  PROVIDED WITH THE DRIVING SIGNAL BEING MUTUAL CAPACITIVELY │
│           COUPLED WITH THE SENSING ELECTRODES               │
│                         1030                                │
└─────────────────────────────────────────────────────────────┘
                              │
                              ▼
┌─────────────────────────────────────────────────────────────┐
│   MEASURING A SIGNAL OF AT LEAST ONE OF THE SENSING         │
│  ELECTRODES BEING PROVIDED WITH THE DRIVING SIGNAL AFTER    │
│ DELAYING IT BY THE DELAY PHASE DIFFERENCE CORRESPONDING TO  │
│   THE ONE OR THE SET OF DRIVING ELECTRODES BEING PROVIDED   │
│    WITH THE DRIVING SIGNAL EACH TIME THE DRIVING SIGNAL IS  │
│                         PROVIDED                            │
│                          1040                               │
└─────────────────────────────────────────────────────────────┘
```

FIG. 10

PROVIDING A CAPACITIVE TOUCH SCREEN INCLUDING A PLURALITY OF DRIVING ELECTRODES ARRANGED IN PARALLEL AND A PLURALITY OF SENSING ELECTRODES ARRANGED IN PARALLEL
1110

REGARDING EACH ONE OR EACH SET OF THE DRIVING ELECTRODES AND EACH INTERSECTING ONE OR A SET OF THE SENSING ELECTRODES AS A DETECTING COMBINATION
1120

DETERMINING A DELAY PHASE DIFFERENCE FOR EACH DETECTING COMBINATION
1130

SEQUENTIALLY PROVIDING A DRIVING SIGNAL TO EACH ONE OR EACH SET OF THE DRIVING ELECTRODES, THE DRIVING ELECTRODES PROVIDED WITH THE DRIVING SIGNAL IN THE DETECTING COMBINATION PROVIDED WITH THE DRIVING SIGNAL BEING MUTUAL CAPACITIVELY COUPLED WITH THE INTERSECTING SENSING ELECTRODES
1140

MEASURING A SIGNAL OF EACH DETECTING COMBINATION BEING PROVIDED WITH THE DRIVING SIGNAL AFTER DELAYING IT BY THE CORRESPONDING DELAY PHASE DIFFERENCE EACH TIME THE DRIVING SIGNAL IS PROVIDED
1150

FIG. 11

SIGNAL MEASURING METHOD AND DEVICE FOR TOUCH SCREEN

CROSS REFERENCE TO RELATED APPLICATIONS

This application is a continuation in part application of U.S. Non-Provisional application Ser. No. 13/545,291, filed Jul. 10, 2012, which claims the benefit of U.S. Provisional Application No. 61/648,710, filed on May 18, 2012, and this application claims the benefit of U.S. Provisional Application No. 61/676,354, filed on Jul. 27, 2012, and the benefit of U.S. Provisional Application No. 61/648,710, filed on May 18, 2012, which is herein incorporated by reference for all intents and purposes.

BACKGROUND OF THE INVENTION

1. Field of the Invention

The present invention relates to a signal measuring method and device for a touch screen, and more particularly, to a signal measuring device and method for a touch screen that compensates the phase delays of the resistor-capacitor (RC) circuits.

2. Description of the Prior Art

A capacitive touch screen determines the locations of touches made by a human body thereon based on changes in detected signals due to its capacitive coupling with the body. When the human touches the screen, noise surrounding the human body also adds to the capacitive coupling between the human body and the capacitive touch screen, and thus causing changes in the detected signals. Moreover, as noise is constantly changing, it cannot be easily determined. When the signal to noise ratio (S/N ratio) is relatively small, a touch may not be detected, or the location of the touch may not be accurately determined.

In addition, as signals may pass through some load circuits, for example, through capacitive coupling, signals received by sensing electrodes of the touch screen will have phase differences with signals before being provided to driving electrodes of the touch screen. If the periods of the driving signals are the same, different phase differences mean that the signals will be received with different delays in time. If said phase differences are not taken into account, then the phases at which signal measuring start will be different and the results will be different. If the measuring results corresponding to different electrodes vary a lot, correct location determination can be challenging.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

In a RC circuit, signals will be delayed as they pass through different loads. If such delays are ignored, then the detected signal will not be desirable. An objective of the present invention is to provide different delay times (or phase differences) to different driving electrodes so as to optimize or levelize the signals for the image detected by the touch screen.

Said and other objectives of the present invention and the solutions for the prior-art problems are achieved by the following technical schemes. The present invention proposes a signal measuring method for a touch screen, which may include: providing a touch screen including a plurality of electrodes comprising a plurality of driving electrodes arranged in parallel and a plurality of sensing electrodes arranged in parallel, the driving electrodes and the sensing electrodes intersecting one another at a plurality of intersections; determining a delay phase difference for each one or each set of driving electrodes; providing a driving signal to one or a set of the driving electrodes, the driving electrodes being provided with the driving signal being mutual capacitively coupled with the sensing electrodes; and each time the driving signal being provided, measuring a signal of at least one of the sensing electrodes being provided with the driving signal after delaying it by the delay phase difference corresponding to the one or the set of driving electrodes being provided with the driving signal.

Said and other objectives of the present invention and the solutions for the prior-art problems are also achieved by the following technical schemes. The present invention proposes a signal measuring method for a touch screen, which may include: providing a touch screen including a plurality of electrodes comprising a plurality of driving electrodes arranged in parallel and a plurality of sensing electrodes arranged in parallel, the driving electrodes and the sensing electrodes intersecting one another at a plurality of intersections; regarding each one or each set of the driving electrodes and each intersecting one or a set of the sensing electrodes as a detecting combination; determining a delay phase difference for each detecting combination; providing a driving signal to one or a set of the driving electrodes, the driving electrodes being provided with the driving signal in the detecting combination being provided with the driving signal being mutual capacitively coupled with the intersecting sensing electrodes; and each time the driving signal being provided, measuring a signal of each detecting combination being provided with the driving signal after delaying it by the corresponding delay phase difference.

Said and other objectives of the present invention and the solutions for the prior-art problems are also achieved by the following technical schemes. The present invention proposes a signal measuring device for a touch screen, which may include: a touch screen including a plurality of electrodes comprising a plurality of driving electrodes arranged in parallel and a plurality of sensing electrodes arranged in parallel, the driving electrodes and the sensing electrodes intersecting one another at a plurality of intersections; a driving circuit for providing a driving signal to one or a set of the driving electrodes, the driving electrodes being provided with the driving signal being mutual capacitively coupled with the sensing electrodes, wherein each one or each set of the driving electrodes corresponds to a delay phase difference; a detecting circuit for determining a delay phase difference for each one or each set of driving electrodes, and each time the driving signal being provided, measuring a signal of at least one of the sensing electrodes being provided with the driving signal after delaying it by the delay phase difference corresponding to the one or set of driving electrodes being provided with the driving signal.

Said and other objectives of the present invention and the solutions for the prior-art problems are also achieved by the following technical schemes. The present invention proposes a signal measuring device for a touch screen, which may include: a touch screen including a plurality of electrodes comprising a plurality of driving electrodes arranged in parallel and a plurality of sensing electrodes arranged in parallel, the driving electrodes and the sensing electrodes intersecting one another at a plurality of intersections; a driving circuit for providing a driving signal to one or a set of the driving electrodes, the driving electrodes being provided with the driving signal in the detecting combination being provided with the driving signal being mutual capacitively coupled with the intersecting sensing electrodes, wherein each one or each set of the driving electrodes and each intersecting one or a set of the sensing electrodes is regarded as a detecting combination, and each detecting combination corresponds to a delay phase difference; and a detecting circuit for measuring a signal of each detecting combination being provided with the driving signal after delaying it by the corresponding delay phase difference each time the driving signal is provided.

With the above technical schemes, the present invention has at least the following advantage and beneficial effect: signals for the image detected by the touch screen can be optimized or levelized since different driving electrodes are provided with different delay times (or phase differences).

BRIEF DESCRIPTION OF THE DRAWINGS

FIGS. 10 and 11 are flowcharts illustrating a signal detecting method for a touch screen according to a first embodiment of the present invention.

DETAILED DESCRIPTION OF THE PREFERRED EMBODIMENTS

Figure 1:
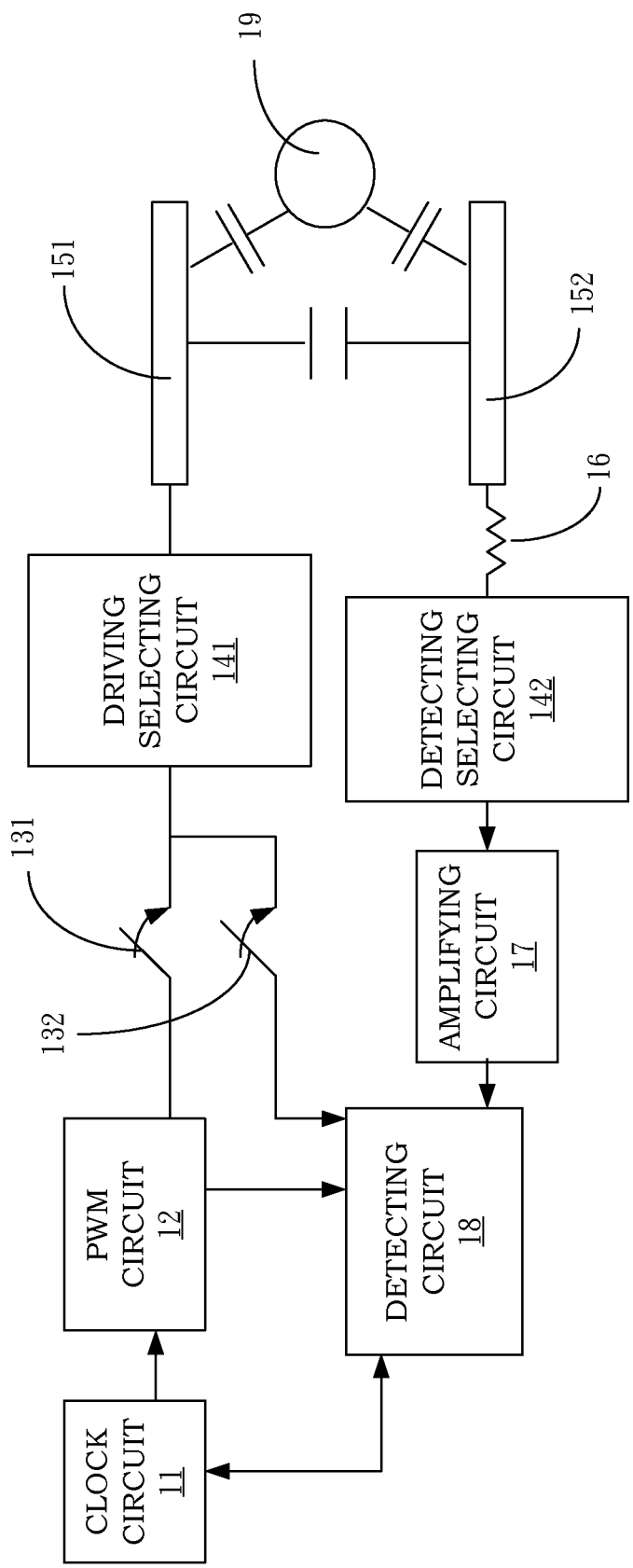
FIG. 1 and FIG. 4 are schematic diagrams illustrating capacitive touch screens and control circuits thereof according to the present invention.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Capacitive touch screens are vulnerable to noise, especially, that coming from the human body touching the screen. The present invention achieves the objective of reducing noise interference with an adaptive driving scheme.

In a capacitive touch screen, a plurality of electrodes arranged in rows and columns are used for detecting locations of the touches, in which power consumption is proportional to the number of simultaneously driving electrodes and the driving voltage. During touch detecting, noise may travel to the capacitive touch screen via the conductor touching the screen, degrading the signal to noise ratio (S/N ratio) and causing misjudgment of a touch or the location of a touch. In other words, the S/N ratio dynamically changes according to the object touching the screen as well as the surrounding environment.

Referring to FIG. 1, a schematic diagram illustrating a capacitive touch screen and a control circuit thereof according to the present invention is shown. It includes a clock circuit 11, a pulse width modulation (PWM) circuit 12, a driving switch 131, a detecting switch 132, a driving selecting circuit 141, a detecting selecting circuit 142, at least one driving electrode 151, at least one sensing electrode 152, a variable resistor 16, an amplifying circuit 17 and a measuring circuit 18. The capacitive touch screen may include the plurality of driving electrodes 151 and the plurality of sensing electrodes 152 crossing each other to form a plurality of intersections.

The clock circuit 11 provides a clock signal for the entire system based on a working frequency, and the PWM circuit 12 provides a PWM signal based on the clock signal and a PWM parameter to drive the driving electrodes 151. The driving switch 131 control the driving of the driving electrodes, and the selecting circuit 141 selects at least one driving electrode 151. In addition, the detecting switch 132 controls the electrical coupling between the driving electrodes and the measuring circuit 18. When the driving switch 131 is turned on, the detecting switch 132 is turned off, the PWM signal is provided via the driving selecting circuit 141 to driving electrode(s) 151 coupled by the driving selecting circuit 141, wherein there can be a plurality of driving electrodes 151, and the selected driving electrode(s) 151 can be one, two, or more. When a driving electrode 151 is driven by the PWM signal, capacitive coupling 152 will be generated at intersections of sensing electrodes 152 and the driving electrode 151 being driven, and each sensing electrode 152 will generate an input signal when capacitively coupled to the driving electrode 151. The variable resistor 16 provides impedance based on a resistor parameter, and the input signal is provided to the detecting selecting circuit 142 via the variable resistor 16. The detecting selecting circuit 142 selects one, two, three, multiple or all of the sensing electrodes 152 to couple with the amplifying circuit 17. The input signal is amplified by the amplifying circuit 17 based on a gain parameter and then provided to the measuring circuit 18. The measuring circuit 18 detects the input signal based on the PWM signal and the clock signal, wherein the measuring circuit 18 samples the detected signal with at least one phase based on a phase parameter. The measuring circuit 18 can, for example, include at least one integration circuit. Each integration circuit performs integration on an input signal in the input signal with at least one phase based on the phase parameter to measure the magnitude of the input signal. In an example of the present invention, each integration circuit performs integration on a pair of input signals in the input signal with at least one phase based on the phase parameter, or performs integration on the difference between signal differences of two pairs of input signals in the input signal with at least one phase based on the phase parameter. Moreover, the measuring circuit 18 may further include at least one analog-to-digital converter (ADC) to convert the detection result into a digital signal. In addition, it can be appreciated by one with ordinary skill in the art that the input signal can be first amplified by the amplifying circuit 17 before providing to the measuring circuit 18 by the detecting selecting circuit 142; the present invention is not limited as such.

In the present invention, capacitive touch screens have at least two types of driving modes: a power saving single-electrode driving mode, and a two-electrode driving mode, and have at least one driving potential. Each driving mode corresponding to a different driving potential has at least one working frequency. Each working frequency corresponds to a set of parameters. Each driving mode corresponding to a different driving potential represents power consumption of a different level.

Figure 2A:
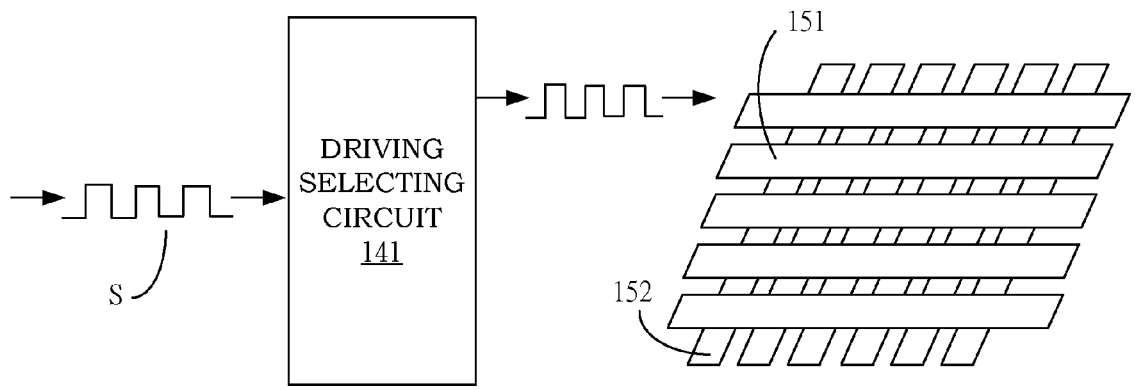
FIG. 2A is a schematic diagram illustrating a single-electrode driving mode.

The electrodes of a capacitive touch screen are divided into a plurality of driving electrodes 151 and a plurality of sensing electrodes 152. The driving electrodes 151 and the sensing electrodes 152 cross each other at various intersections. Referring to FIG. 2A, in the single-electrode driving mode, driving electrodes 151 are driven one at a time, that is, in any one instance, only a single driving electrode 151 is provided with a driving signal S. When any driving electrode 151 is driven, signals of all of the sensing electrodes 152 are detected to generate one-dimensional (1D) sensing information. Accordingly, after all the driving electrodes 151 are driven, 1D sensing information corresponding to every driving electrode 151 is obtained, which together constitute a full image corresponding to all intersections.

Figure 2B:
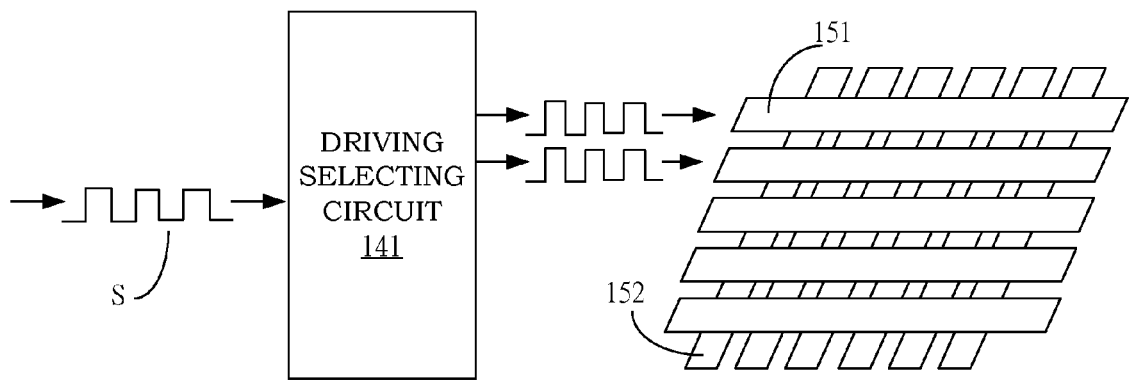
FIGS. 2B and 2C are schematic diagrams illustrating a two-electrode driving mode.
Figure 2C:
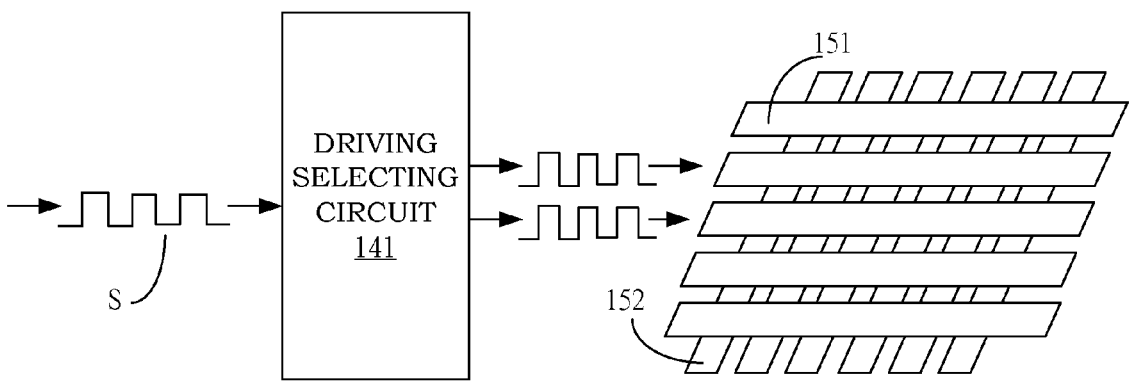

Referring to FIGS. 2B and 2C, in the two-electrode driving mode, a pair of adjacent driving electrodes 151 is driven at a time. In other words, n driving electrodes 151 require n−1 times of driving. When any pair of driving electrodes 151 is driven, signals of all of the sensing electrodes 152 are detected to generate 1D sensing information. For example, first, as shown in FIG. 2B, a driving signal S is simultaneously provided to a first pair of driving electrodes 151, if there are 5 driving electrodes, driving is performed 4 times. Then, as shown in FIG. 2C, the driving signal S is simultaneously provided to a second pair of driving electrodes 151, and so on. Accordingly, after every pair (a total of n−1 pairs) of driving electrodes 151 are driven, 1D sensing information corresponding to each pair of driving electrodes 151 is obtained, which together constitute a reduced image in comparison to the full image. The number of pixels of the reduced image is less than that of the pixels of the full image. In another example of the present invention, the two-electrode driving mode further includes perform single-electrode driving on driving electrodes 151 on either end. When the driving electrodes 151 on either end is driven, signals of all the sensing electrodes 152 are detected to generate 1D sensing information, together they provide two 1D sensing information, which form an expanded image with the reduced image. For example, 1D sensing information corresponding to either side is placed outside the two ends of the reduced image to form the expanded image.

It can be appreciated by one with ordinary skill in the art that the present invention may also include three-electrode driving mode, four-electrode driving mode and the like, and they will not be further illustrated to avoid redundancy.

The driving potential may include, but is not limited to, at least two driving potentials, such as a low driving potential and a high driving potential. A higher driving potential has a higher S/N ratio.

According to the above, in the single-electrode driving mode, a full image can be obtained, whereas in the two-electrode driving mode, a reduced image and an expanded image can be obtained. The full image, the reduced image and the expanded image can be obtained before or when an external conductive object 19 approaches or touches the capacitive touch screen. The external conductive object 19 can be one or more. As mentioned before, when the external conductive object 19 approaches or touches the capacitive touch screen, or capacitive couples with the driving electrode(s) 151 and the sensing electrode(s) 152, noise interference may arise, even when the driving electrode 151 is not driven, the external conductive object 19 may still capacitive couple with the driving electrode(s) 151 and the sensing electrode(s) 152. Moreover, noise may interfere through some other routes.

Accordingly, in an example of the present invention, during a noise detecting process, the driving switch 131 is turned off, and the detecting switch 132 is turned on, such that the measuring circuit can generate 1D sensing information of noise detection based on the signals of the sensing electrodes 152, thereby determining if the noise interference is within a tolerable range. For example, whether the noise interference is within the tolerable range can be determined by determining whether the 1D sensing information of noise detection exceeds a threshold, or whether the sum or the average of all the values of the 1D sensing information of noise detection exceeds a threshold. It can be appreciated by one with ordinary skill in the art that there are other ways of determining whether the noise interference is within the tolerable range based on the 1D sensing information of noise detection, which the present invention will not further illustrate.

The noise detecting process can be performed upon system activation, or every time the full, the reduced, or the expanded image is obtained, or regularly or multiple times when the full, the reduced, or the expanded image is obtained, or when the approach or touch of an external conductive object is detected. It can be appreciated by one with ordinary skill in the art that there are other suitable timings for performing the noise detecting process; the present invention is not limit to these.

The present invention further proposes a frequency switching process for switching frequencies when the noise interference exceeds the tolerable range. The measuring circuit is provided with several sets of frequency settings, which can be stored in a memory or other storage media and can be selected by the measuring circuit during the frequency switching process. The clock signal of the clock circuit 11 is thus controlled by the selected frequency. The frequency switching process may include selects a suitable frequency setting from the frequency settings, for example, sequentially uses a set of frequency setting and performs the noise detecting process until the noise interference is within the tolerable range. The frequency switching process may alternatively include selects the best frequency setting from the frequency settings, for example, sequentially uses a set of frequency setting and performs the noise detecting process, and selects the frequency setting with the least noise interference, for example, the frequency setting with the smallest maximum value of the 1D sensing information of noise detection, or the frequency setting with the smallest sum or average of all the values of the 1D sensing information of noise detection.

The frequency settings include, but are not limited to, a driving mode, a frequency and a set of parameters. The set of parameters may include, but is not limited to, said resistor parameter, said gain parameter, said phase parameter and said PWM parameter. It can be appreciated by one with ordinary skill in the art that there are other parameters suitable for the capacitive touch screen and its control circuit.

The frequency settings may include a plurality of driving potentials, such as a first driving potential and a second driving potential, as shown in Table 1 below. It can be appreciated by one with ordinary skill in the art that there can be three or more driving potentials. Each driving potential can be divided into several driving modes, including, but not limited to, single-electrode driving mode, two-electrode driving mode, three-electrode driving mode, four-electrode driving mode etc. Each driving mode of each driving potential includes a plurality of frequencies, each frequency corresponds to a set of parameters just mentioned. It can be appreciated by one with ordinary skill in the art that the frequencies of each driving mode corresponding to each driving potential may be entirely different, or partially the same; the present invention is not limited as such. Table 1

| Driving Potential | Driving Mode | Frequency | Parameter Set |
|---|---|---|---|
| First driving potential | Single-electrode driving mode | First frequency | First parameter set |
| | | First frequency | First parameter set |
| | | ... | ... |
| | | $i^{th}$ frequency | $i^{th}$ parameter set |
| | Two-electrode driving mode | $i + 1^{th}$ frequency | $i + 1^{th}$ parameter set |
| | | $i + 2^{th}$ frequency | $i + 2^{th}$ parameter set |
| | | ... | ... |
| | | $j^{th}$ frequency | $j^{th}$ parameter set |
| Second driving potential | Single-electrode driving mode | $j + 1^{th}$ frequency | $j + 1^{th}$ parameter set |
| | | $j + 2^{th}$ frequency | $j + 2^{th}$ parameter set |
| | | ... | ... |
| | | $k^{th}$ frequency | $k^{th}$ parameter set |
| | Two-electrode driving mode | $k + 1^{th}$ frequency | $k + 1^{th}$ parameter set |
| | | $k + 2^{th}$ frequency | $k + 2^{th}$ parameter set |
| | | ... | ... |
| | | $n^{th}$ frequency | $n^{th}$ parameter set |

Figure 3A:
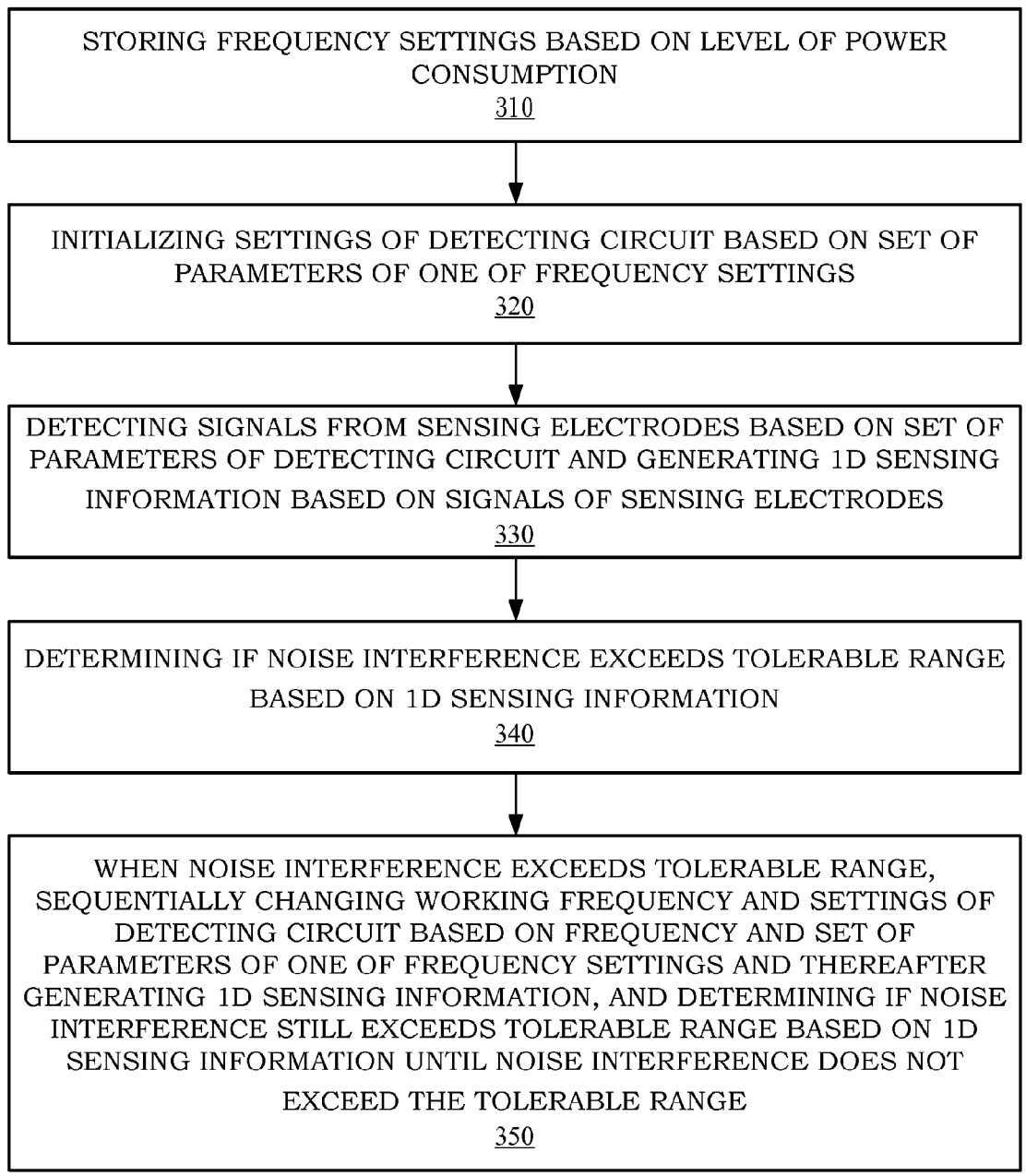
FIGS. 3A and 3B is a flowchart illustrating a detecting method for a capacitive touch screen according to the present invention.

According to the above, the present invention proposes a detecting method for a capacitive touch screen. Referring to FIG. 3A, first, in step 310, a plurality of frequency settings are stored based on the levels of power consumption. Each frequency setting corresponds to a driving mode of a driving potential, and each frequency setting has a frequency and a set of parameters, wherein there are at least one type of driving potential. Next, in step 320, the setting of a detecting circuit is initialized based on the set of parameter of one of the frequency settings, and in step 330, signals of the sensing electrodes are detected by the detecting circuit based on a set of parameters of the detecting circuit, and 1D sensing information is generated from the signals of the sensing electrodes. Then, in step 340, it is determined whether noise interference exceeds a tolerable range based on the 1D sensing information. Thereafter, in step 350, when the noise interference exceeds the tolerable range, the working frequency and the setting of the detecting circuit are changed according to the frequency and the set of parameter of one of the frequency settings, and 1D sensing information is generated, and then it is again determined whether the noise interference exceeds the tolerable range based on the 1D sensing information. This step is repeated until the noise interference is within the tolerable range. Alternatively, in step 360 of FIG. 3B, when the noise interference exceeds the tolerable range, the working frequency and the setting of the detecting circuit are changed according to the frequency and the set of parameter of every of the frequency settings, and 1D sensing information is generated and then the noise interference is determined based on the 1D sensing information, and the working frequency and the setting of the detecting circuit are changed to the frequency and the set of parameter of the frequency setting that is least interfered by noise.

For example, a detecting device for a capacitive touch sensor is proposed according to the present invention, which includes a storage circuit 43, a driving circuit 41 and a detecting circuit 42. As described in step 310, the storage circuit 43 includes a plurality of frequency settings 44 stored according to the levels of power consumption. The storage circuit 43 can be a circuit, a memory or a storage media capable of storing electromagnetic records. In an example of the present invention, the frequency settings 44 can be implemented as a lookup table. In addition, the frequency settings 44 can also store a power consumption parameter.

The driving circuit 41 can be an integration of several circuits, including, but not limited to, the clock circuit 11, the PWM circuit 12, the driving switch 131, the detecting switch 132 and the driving selecting circuit 141. The circuits listed in this example is merely for illustration purpose, and the driving circuit 41 may only include some of the circuits or add more circuits; the present invention is not limited as such. The driving circuit is used to provide a driving signal to at least one driving electrode 151 of a capacitive touch screen according to a working frequency, wherein the capacitive touch screen includes a plurality of driving electrodes 151 and a plurality of sensing electrodes 152

Figure 3B:
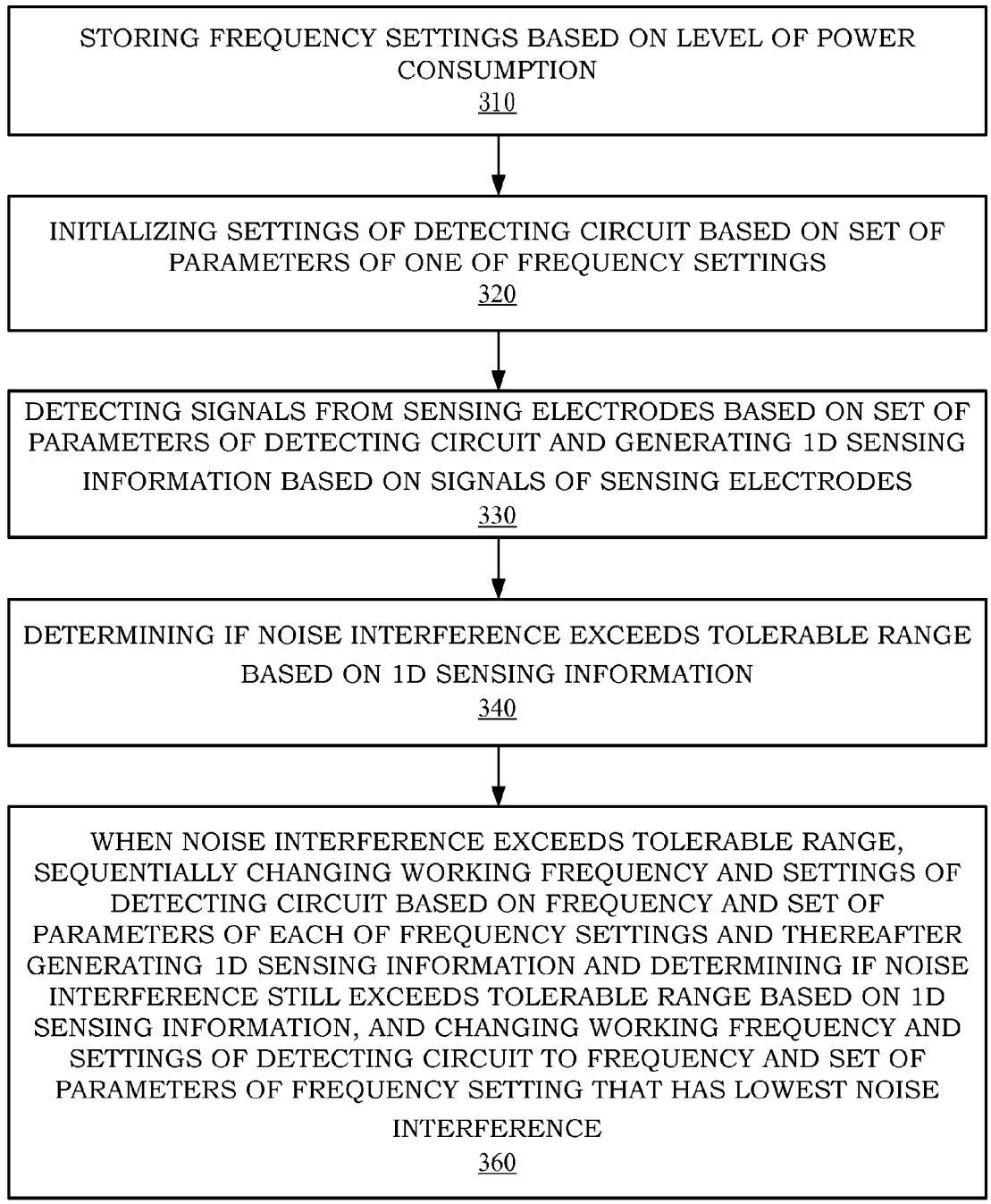
Figure 4:
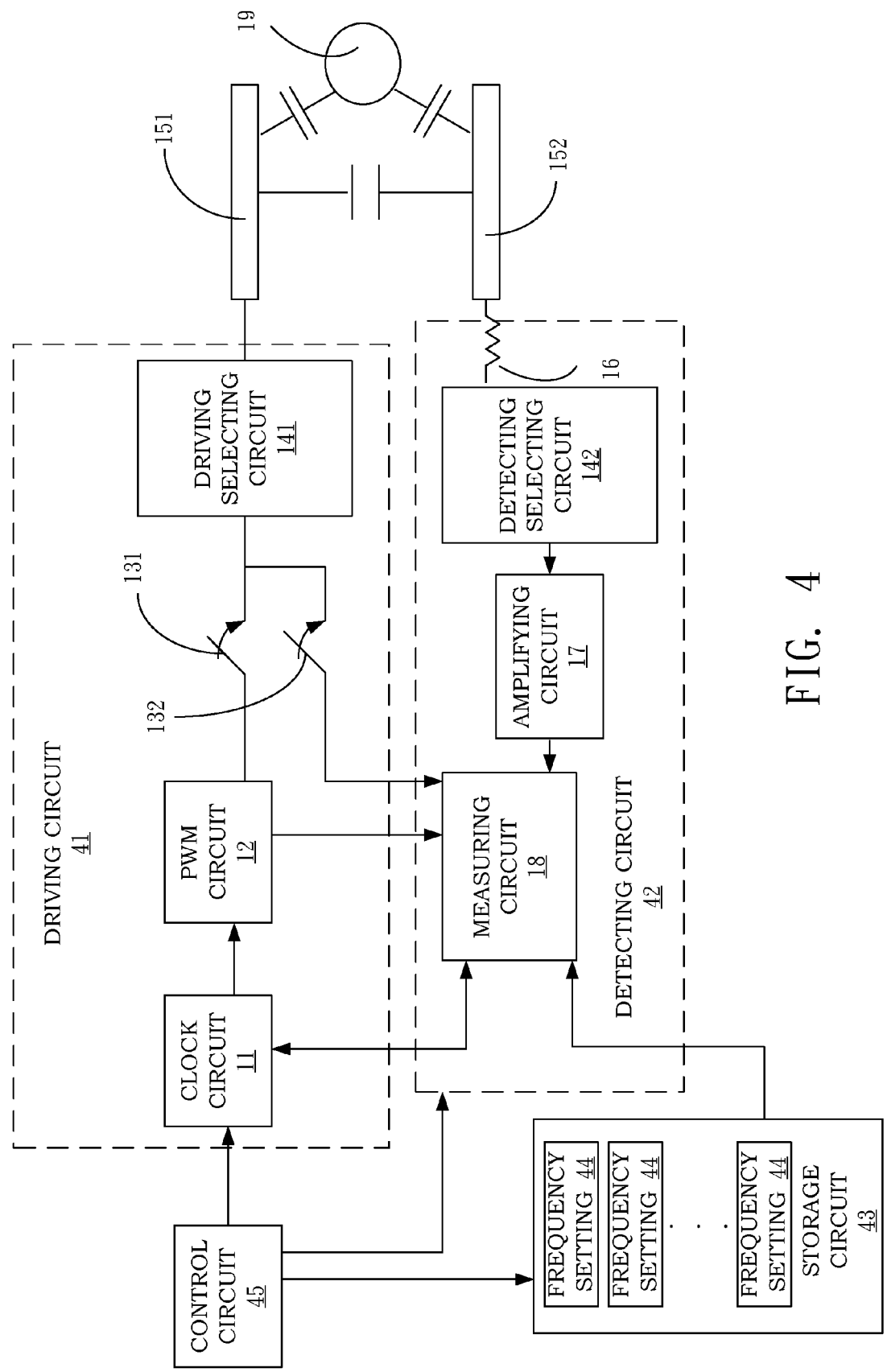

The detecting circuit 42 can be an integration of several circuits, including, but not limited to, the measuring circuit 18, the amplifying circuit 17, the detecting selecting circuit 142, and even the variable resistor 16. The circuits in this example is provided merely for illustration purpose, and the detecting circuit 42 may only include some of the circuits or include additional circuits; the present invention is not limited as such. Furthermore, the detecting circuit 42 further includes performing the steps 320 to 340, and step 350 or step 360 above. In the example of FIG. 3B, the frequency settings are not necessarily stored according to the levels of power consumption.

As previously described, the 1D sensing information for determining whether the noise interference exceeds the tolerable range is generated when no driving signal is provided to the driving electrode(s), for example, when the driving switch 131 is turned off and the detecting switch 132 is turned on.

In an example of the present invention, the at least one driving potential has several types of driving modes, including a single-electrode driving mode and a two-electrode driving mode. In the single-electrode driving mode, the driving signal is provided to only a single driving electrode at any instance, while in the two-electrode driving mode, the driving signal is provided to a pair of driving electrodes simultaneously. The level of power consumption of the single-electrode driving mode is less than the level of power consumption in the two-electrode driving mode. In addition, in the single-electrode driving mode, when every driving electrode is driven by the driving signal, 1D sensing information is generated by the detecting circuit to constitute a full image. In the two-electrode driving mode, when every pair of driving electrodes is driven by the driving signal, 1D sensing information is generated by the detecting circuit to constitute a reduced image. The number of pixels of the reduced image is less than that of the pixels of the full image. Moreover, in the two-electrode driving mode, the detecting circuit may further perform single-electrode driving on electrodes at either end. When the electrodes at either end are driven, signals of all the sensing electrodes are detected to generate 1D sensing information, wherein the 1D sensing information for the electrodes at either side are placed outside the two sides of the reduced image to form the expanded image, and the number of pixels of the expanded image is greater than that of the pixels of the full image.

In another example of the present invention, the driving potential includes a first driving potential and a second driving potential, wherein the level of power consumption for generating the full image in the single-electrode driving mode of the first driving potential>the level of power consumption for generating the reduced image in the two-electrode driving mode of the first driving potential>the level of power consumption for generating the full image in the single-electrode driving mode of the second driving potential.

In yet another example of the present invention, the driving potential includes a first driving potential and a second driving potential, wherein the level of power consumption for generating the full image in the single-electrode driving mode of the first driving potential>the level of power consumption for generating the full image in the single-electrode driving mode of the second driving potential.

Moreover, in an example of the present invention, the signal of each sensing electrode is passed through a variable resistor before providing to the detecting circuit. The detecting circuit sets the impedance of the variable resistor according to the set of parameter of one of the frequency settings. In addition, the signals of the sensing electrodes are first amplified by at least one amplifier before being detected. The detecting circuit sets the gain of the amplifier according to the set of parameter of one of the frequency settings. In addition, the driving signal is generated according to the set of parameter of one of the frequency settings.

In an example of the present invention, each value of 1D sensing information is generated according to the signals of the sensing electrodes in a defined period, wherein the defined period is determined according to the set of parameter of one of the frequency settings. In an example of the present invention, each value of 1D sensing information is generated according to the signals of the sensing electrodes with at least one defined phase, wherein the defined phase is determined according to the set of parameter of one of the frequency settings.

Furthermore, the driving circuit 41, the detecting circuit 42 and the storage circuit 43 described above can be controlled by a control circuit 45. The control circuit 45 can be a programmable processor or other types of control circuit; the present invention is not limited as such.

Figure 5:
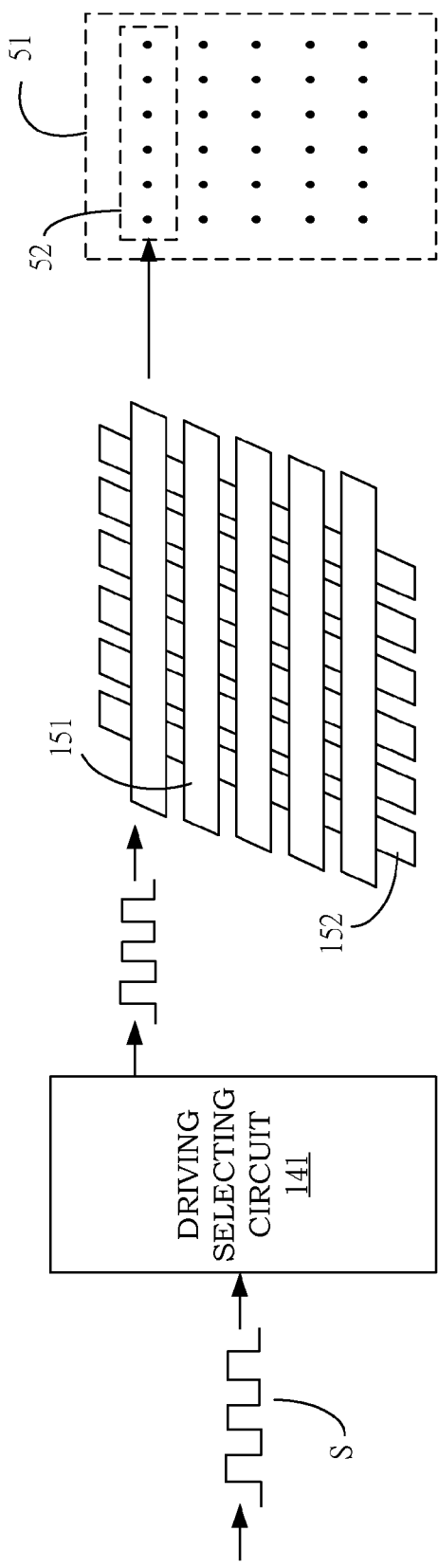
FIG. 5 is a schematic diagram illustrating the generation of a full image.

Referring to FIG. 5, a schematic diagram illustrating the single-electrode driving mode of the present invention is shown. A driving signal S is sequentially provided to a first driving electrode, a second driving electrode . . . and the last driving electrode. 1D sensing information for single-electrode driving 52 is generated when each driving electrode is driven by the driving signal S. All the 1D sensing information for single-electrode driving 52 are combined together to constitute a full image 51. Each value of the full image 51 corresponds to changes in capacitive coupling of one of the electrode intersections.

Furthermore, each value of the full image 51 corresponds to a location of one of the intersections. For example, the center location of each driving electrode corresponds to a first 1D coordinate, while the center location of each sensing electrode corresponds to a second 1D coordinate. The first 1D coordinate can be one of a lateral (e.g. horizontal or X-axis) coordinate and longitudinal (e.g. vertical or Y-axis) coordinate, while the second 1D coordinate can be the other one of a lateral (e.g. horizontal or X-axis) coordinate and longitudinal (e.g. vertical or Y-axis) coordinate. Each intersection corresponds to a 2D coordinate of a driving electrode and a sensing electrode intersecting thereat. The 2D coordinate is made up of the first 1D coordinate and the second 1D coordinate, for example, (first 1D coordinate, second 1D coordinate) or (second 1D coordinate, first 1D coordinate). In other words, the 1D sensing information generated by each single-electrode driving corresponds to the first 1D coordinate at the center of a driving electrode, wherein each value of the 1D sensing information for single-electrode driving (or each value of the full image) corresponds to a 2D coordinate made up of the first 1D coordinate at the center of the driving electrode and the second 1D coordinate at the center of a sensing electrode. Similarly, each value of the full image corresponds to the center location of one of the intersections, that is, corresponds to a 2D coordinate made up of the first 1D coordinate at the center of a driving electrode and the second 1D coordinate at the center of a sensing electrode.

Figure 6:
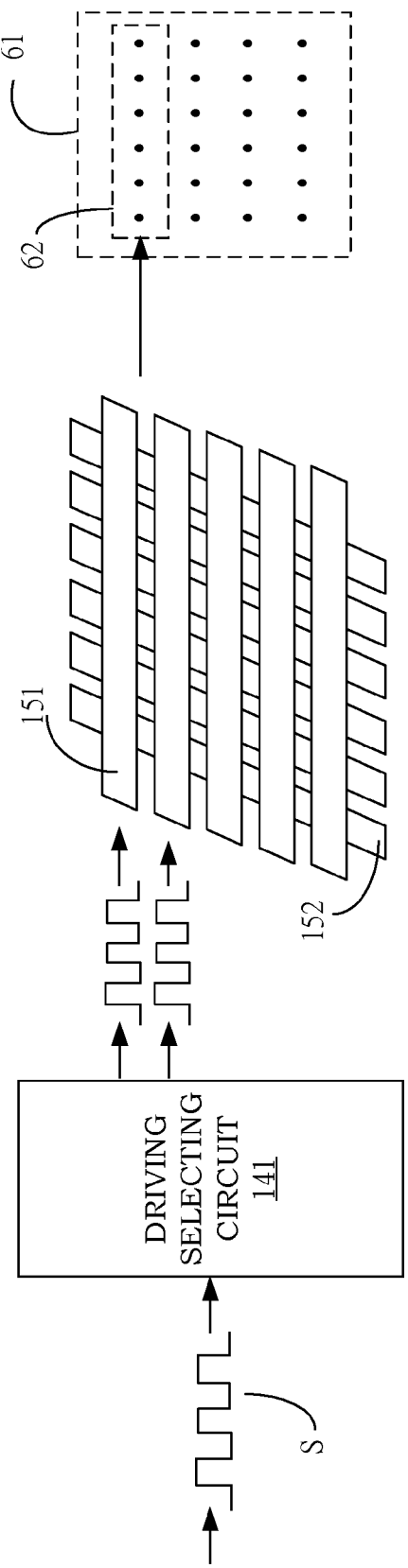
FIG. 6 is a schematic diagram illustrating the generation of a reduced image.

Referring to FIG. 6, a schematic diagram illustrating the two-electrode driving mode of the present invention is shown. A driving signal S is sequentially provided to a first pair of driving electrodes, a second pair of driving electrodes . . . and the last pair of driving electrodes. 1D sensing information for two-electrode driving 62 is generated when each pair of driving electrodes is driven by the driving signal S. In other words, N driving electrodes make up N−1 (multiple) pairs of driving electrodes. All the 1D sensing information for two-electrode driving 62 are combined together to constitute a reduced image 61. The number of values (or pixels) of the reduced image 61 is less than the number of values (or pixels) of the full image 51. In contrast to the full image, each 1D sensing information for two-electrode driving 62 of the reduced image corresponds to a first 1D coordinate of a center location between a pair of driving electrodes, and each value corresponds to a 2D coordinate made up of the first 1D coordinate of the center location between the pair of driving electrodes and a second 1D coordinate at the center of a sensing electrode. In other words, each value of the reduced image corresponds to the location of the center between a pair of intersections, that is, corresponds to a 2D coordinate made up of the first 1D coordinate of the center location between a pair of driving electrodes (or one of several pairs of driving electrodes) and a second 1D coordinate at the center of a sensing electrode.

Figure 7A:
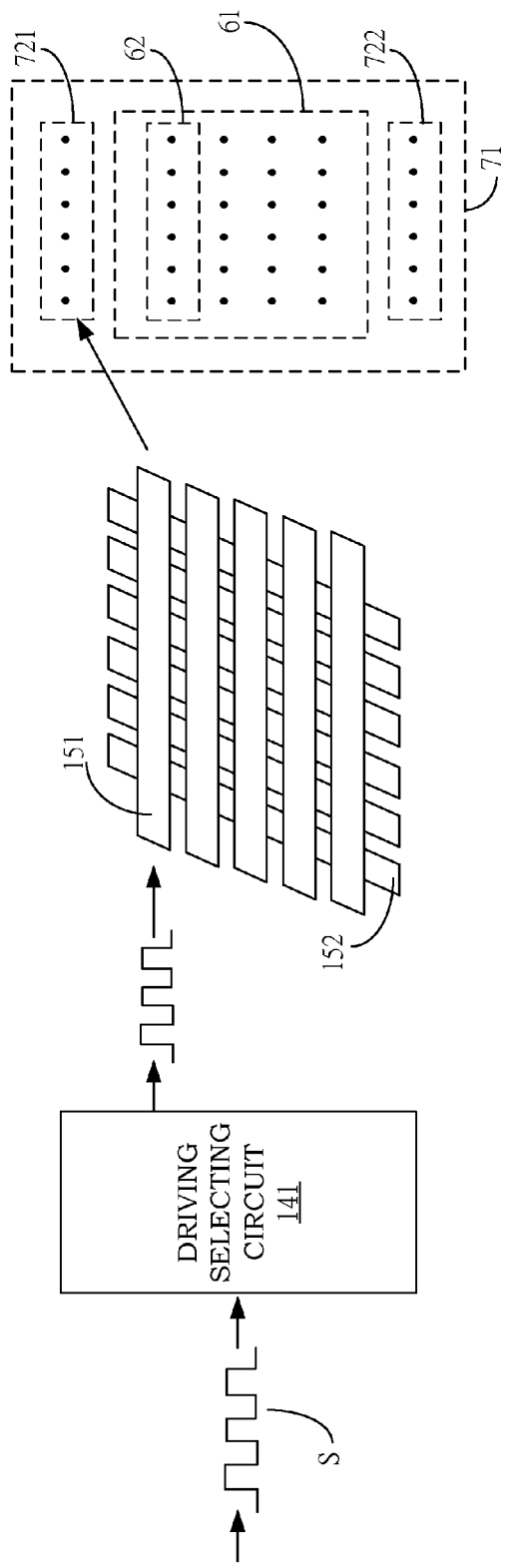
FIGS. 7A and 7B are schematic diagrams illustrating the generation of an expanded image.
Figure 7B:
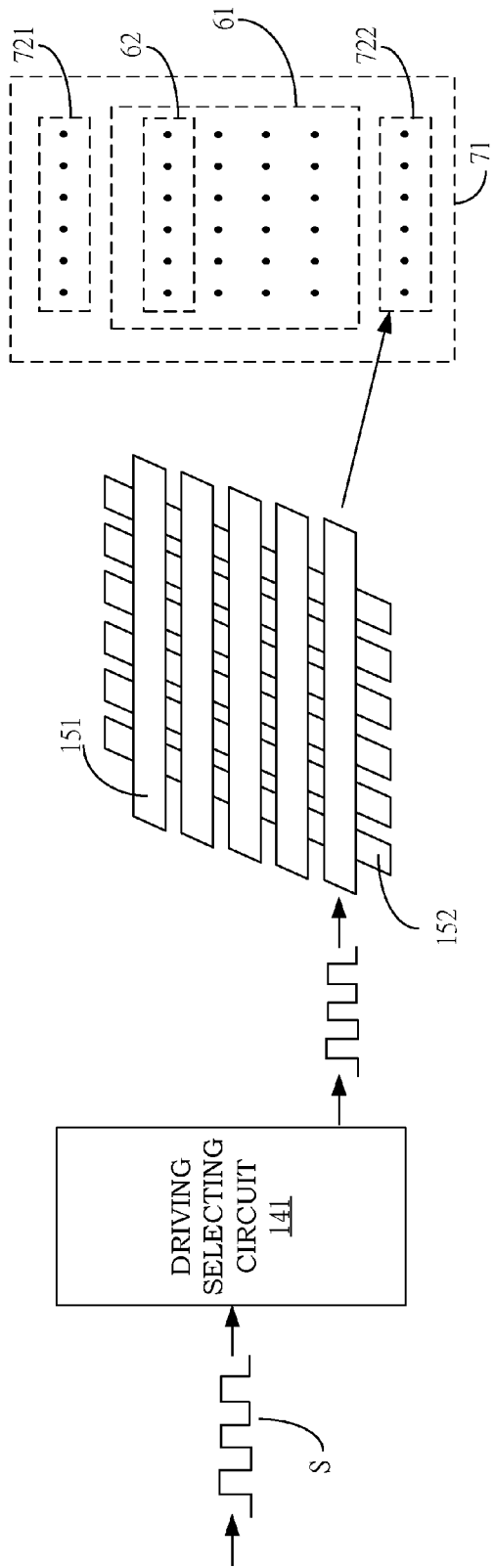

Referring to FIG. 7A, a schematic diagram illustrating a first side single-electrode driving in the two-electrode driving mode according to the present invention is shown. A driving signal S is provided to a driving electrode nearest to a first side of a capacitive touch screen, and first-side 1D sensing information for single-electrode driving 721 is generated when the driving electrode nearest to the first side of the capacitive touch screen is being driven by the driving signal S. Now referring to FIG. 7B, a schematic diagram illustrating a second side single-electrode driving in the two-electrode driving mode according to the present invention is shown. A driving signal S is provided to a driving electrode nearest to a second side of a capacitive touch screen, and second-side 1D sensing information for single-electrode driving 722 is generated when the driving electrode nearest to the second side of the capacitive touch screen is being driven by the driving signal S. The 1D sensing information for single-electrode driving 721 and 722 generated when the driving electrodes nearest to the first and second sides of the capacitive touch screen are being driven are placed outside the first and second sides of the reduced image 61 mentioned before, respectively, to form an expanded image 71. The number of values (or pixels) in the expanded image 71 is greater than the number of values (or pixels) in the full image 51. In an example of the present invention, the first-side 1D sensing information for single-electrode driving 721 is generated first, then the reduced image 61 is generated, and then the second-side 1D sensing information for single-electrode driving 722 is generated to construct the expanded image 71. In another example of the present invention, the reduced image 61 is generated first, and thereafter, the first- and second-side 1D sensing information for single-electrode driving 721 and 722 are generated to construct the expanded image 71.

In other words, the expanded image is made up of the first-side 1D sensing information for single-electrode driving, the reduced image and the second-side 1D sensing information for single-electrode driving. Since the values in the reduced image 61 are two-electrode driven, so the average magnitude will be greater than that of the first- and second-side 1D sensing information for single-electrode driving. In an example of the present invention, the values of the first- and second-side 1D sensing information for single-electrode driving 721 and 722 are first amplified by a ratio before placing outside the first and second sides of the reduced image 61. This ratio can be a predetermined multiple greater than 1, or based on the ratio between the values of the 1D sensing information for two-electrode driving and the values of the 1D sensing information for single-electrode driving, for example, the ratio between the sum (or average) of all the values of the first-side 1D sensing information for single-electrode driving 721 and the sum (or average) of all the values of the 1D sensing information 62 near the first side in the reduced image, and the values of the first-side 1D sensing information for single-electrode driving 721 are amplified by this ratio before placing outside the first side of the reduced image 61. Similarly, the values of the second-side 1D sensing information for single-electrode driving 722 are amplified by this ratio before placing outside the second side of the reduced image 61. Alternatively, for example, said ratio is the ratio between the sum (or average) of all the values in the reduced image 61 and the sum (or average) of all the values of the first- and second-side 1D sensing information for single-electrode driving 721 and 722.

In the single-electrode driving mode, each value (or pixel) of the full image corresponds to a 2D location (or coordinate) of an intersection made up of the first 1D location (or coordinate) corresponding to the driving electrode and the second 1D location (or coordinate) corresponding to the sensing electrode intersecting at the intersection, for example (first 1D location, second 1D location) or (second 1D location, first 1D location). A single external conductive object may be capacitively coupled to one or more intersections. The intersection(s) capacitively coupled to the external conductive object generate(s) changes in capacitive coupling, which are reflected in the corresponding value(s) in the full image, that is, in the corresponding value(s) in the full image corresponding to the external conductive object. Thus, based on the corresponding values and 2D coordinates in the full image corresponding to the external conductive object, a centroid location (a 2D coordinate) of the external conductive object can be calculated.

In an example of the present invention, in the single-electrode driving mode, the 1D location corresponding to each electrode (driving and sensing electrodes) is the location of the center of the electrode. Based on another example of the present invention, in the two-electrode driving mode, the 1D location corresponding to each pair of electrodes (driving and sensing electrodes) is the location of the center between the two electrodes.

In the reduced image, a first 1D sensing information corresponds to the center location of a first pair of driving electrodes, that is, a first 1D location of the center between a first and a second driving electrodes (the first pair of driving electrodes). If the centroid location is simply calculated, a location can be calculated only in the range from the center of the first pair of driving electrodes to the center of the last pair of driving electrodes. The range in which the location is calculated based on the reduced image lacks a range from the center location of the first driving electrode to the center location (the first 1D location of the center) of the first pair of driving electrodes, and a range from the center location of the last pair of driving electrodes to the center location of the last driving electrode.

In contrast to the reduced image, in the expanded image, the first- and second-side 1D sensing information correspond to the center locations of the first and last driving electrodes, respectively. Thus, the range in which the location is calculated based on the expanded image, compared to that calculated based on the reduced image, further includes the range from the center location of the first driving electrode to the center location (the first 1D location of the center) of the first pair of driving electrodes, and the range from the center location of the last pair of driving electrodes to the center location of the last driving electrode. In other words, the range in which the location is calculated based on the expanded image covers the range in which the location is calculated based on the full image.

Similarly, the two-electrode driving mode can be further expanded to a multiple-electrode driving mode, that is, multiple driving electrodes are simultaneously driven. In other words, the driving signal is simultaneously provided to multiple (or all) driving electrodes in a set of driving electrodes. The number of driving electrodes in a set of driving electrodes may, for example, be two, three or four. The multiple-electrode driving mode includes the two-electrode driving mode, but not the single-electrode driving mode.

Figure 8:
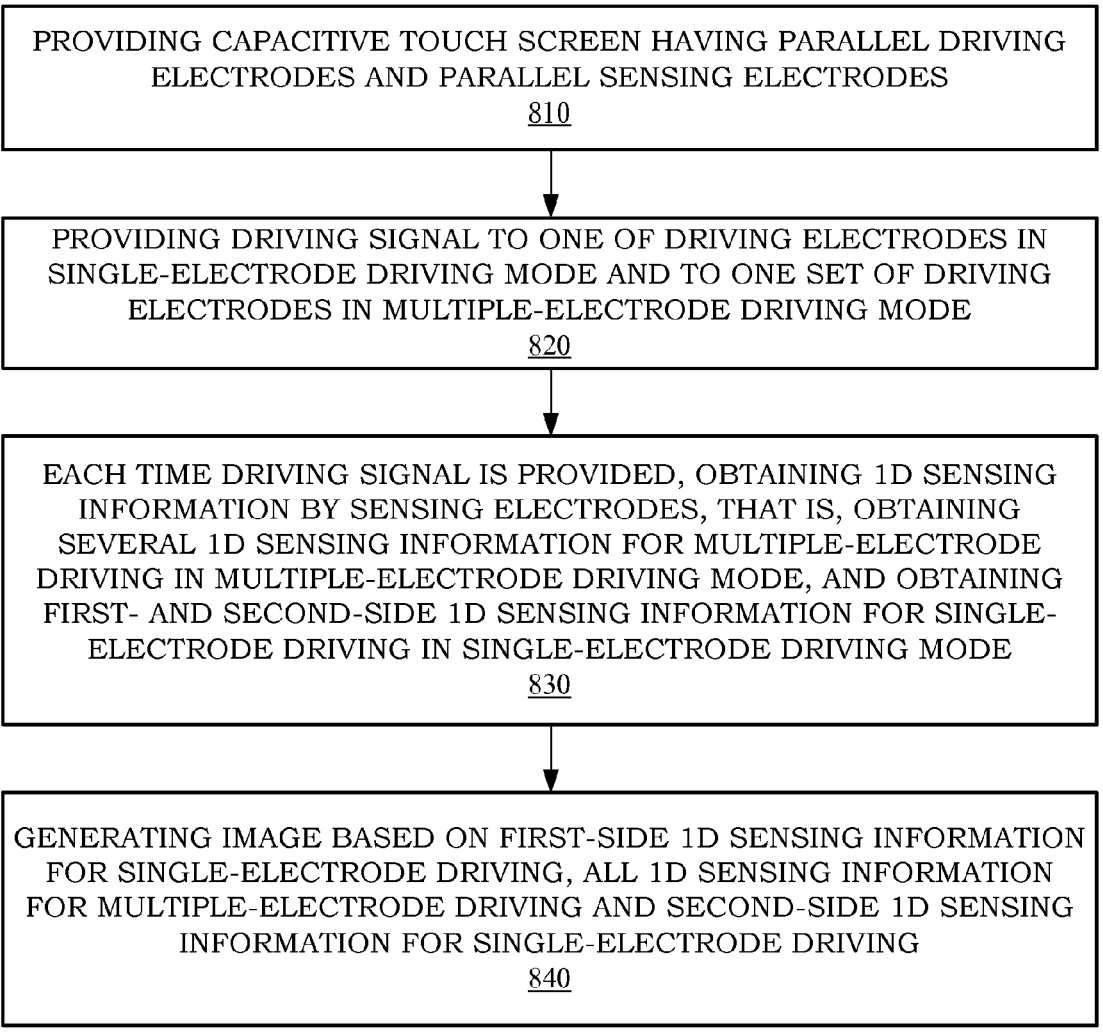
FIG. 8 is a flowchart illustrating the generation of the expanded image according to the present invention.

Referring to FIG. 8, a detecting method for a capacitive touch screen according to the present invention is shown. In step 810, a capacitive touch screen including a plurality of parallel driving electrodes and a plurality of parallel sensing electrodes is provided, wherein the driving electrodes and the sensing electrodes (e.g. the driving electrodes 151 and the sensing electrodes 152) cross each other at intersections. Next, in step 820, one and a set of driving electrodes among the plurality of driving electrodes is/are provided with a driving signal in the single-electrode driving mode and the multiple-electrode driving mode, respectively, that is, one of the driving electrodes are driven by the driving signal at a time in the single-electrode driving mode, while a set of driving electrodes in the driving electrodes are simultaneously driven by the driving signal at a time in the multiple-electrode driving mode, wherein apart from the last N driving electrodes, each driving electrodes and two successive driving electrodes form the set of driving electrodes to be driven simultaneously, and N is the number of the set minus one. The driving signal can be provided by the driving circuit 41 described before. Thereafter, in step 830, each time the driving signal is provided, 1D sensing information is obtained via the sensing electrodes; more specifically, a plurality of 1D sensing information for multiple-electrode driving are obtained in the multiple-electrode driving mode and first- and second-side 1D sensing information for single-electrode driving are obtained in the single-electrode driving mode. For example, in the multiple-electrode driving mode, one 1D sensing information for multiple-electrode driving is obtained when each set of driving electrodes are provided with the driving signal. Alternatively, for example, in the single-electrode driving mode, one first-side 1D sensing information for single-electrode driving and one second-side 1D sensing information for single-electrode driving are obtained when the first driving electrode and the last driving electrode are provided with the driving signal, respectively. The 1D sensing information can be obtained by the detecting circuit 42 described above. The 1D sensing information thus includes the 1D sensing information for multiple-electrode driving (reduced image) and the first- and second-side 1D sensing information for single-electrode driving. Then, in step 840, an image (an expanded image) is generated according to the first-side 1D sensing information for single-electrode driving, all the 1D sensing information for multiple-electrode driving and the second-side 1D sensing information for single-electrode driving. Step 840 can be performed by the control circuit described before.

As described before, the potential of the driving signal in the single-electrode driving mode is not necessary the same as the potential of the driving signal in the multiple-electrode driving mode; they can be the same or different. For example, the single-electrode driving is performed with a first AC potential larger than a second AC potential for the multiple-electrode driving. The ratio of the first AC potential to the second AC potential can be a predetermined ratio. In addition, in step 840, the image is generated based on all the values of the first- and second-side 1D sensing information for single-electrode driving being multiplied by the same predetermined ratio or different predetermined ratios. Moreover, the frequency of the driving signal in the single-electrode driving mode can be different from that of the driving signal in the multiple-electrode driving mode.

The number of driving electrodes in the set of driving electrodes can be two, three or more; the present invention is not limited to these. In a preferred mode of the present invention, the number of driving electrodes in the set of driving electrodes is two. When the number of driving electrodes in the set of driving electrodes is two, each driving electrode corresponds to a first 1D coordinate, wherein 1D sensing information driven by each group (or pair) of the electrodes corresponds to a first 1D coordinate of the center between the pair of driving electrodes among the plurality of driving electrodes, and the first- and second-side 1D sensing information for single-electrode driving correspond to first 1D coordinates of the first and the last driving electrodes, respectively.

Similarly, when the number of driving electrodes in the set of driving electrodes is more than two, each driving electrode corresponds to a first 1D coordinate, wherein 1D sensing information driven by each set of multiple electrodes corresponds to a first 1D coordinate of the center between two driving electrode separated the furthest in the set of driving electrodes, and the first- and second-side 1D sensing information for single-electrode driving correspond to first 1D coordinates of the first and the last driving electrodes, respectively.

Moreover, each sensing electrode corresponds to a second 1D coordinate, and each value of each 1D sensing information corresponds to the second 1D coordinate of one of the sensing electrodes.

Figure 9A:
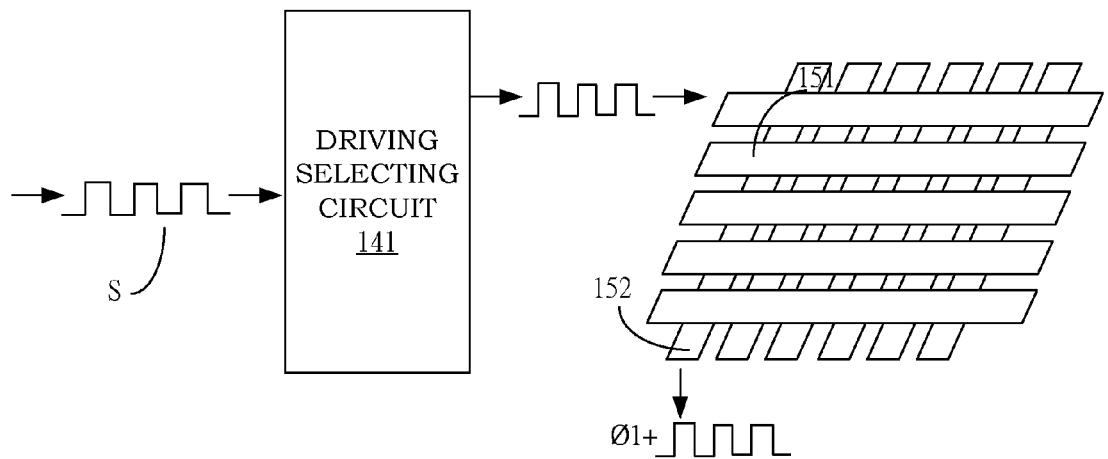
FIGS. 9A and 9B are schematic diagrams illustrating a driving signal generating different phase differences via different driving electrodes.
Figure 9B:
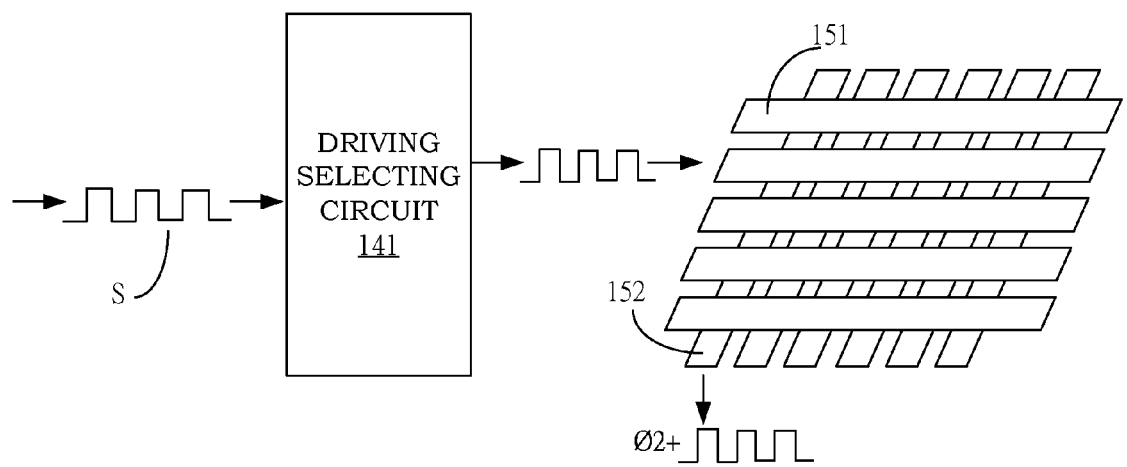

Referring to FIGS. 9A and 9B, a schematic diagram illustrating sensing electrodes receiving capacitive coupling signals through driving electrodes. As signals pass through some load circuits, for example, through capacitive coupling, signals received by the sensing electrodes will have phase differences with signals before being provided to the driving electrodes. For example, when a driving signal is provided to a first driving electrode, the signal received by a first sensing electrode will have a first phase difference $\phi 1$ with the signal before being provided to the driving electrode, as shown in FIG. 9A. When the driving signal is provided to a second driving electrode, the signal received by the first sensing electrode will have a second phase difference $\phi 2$ with the signal before being provided to the driving electrode, as shown in FIG. 9B.

The first phase difference $\phi 1$ and the second phase difference $\phi 2$ will be different from each other since the corresponding driving signals pass through different resistor-capacitor (RC) circuits. When the periods of the driving signals are the same, different phase differences mean that the signals will be received with different delays in time. If signals are measured without taking said phase differences into account, then the phases at which signal detection start will be different and the results will be different. For example, assuming the phase difference is 0, and the signal is a sinusoidal wave with amplitude of A. When the signal is measured at phases 30 degrees, 90 degrees, 150 degrees, 210 degrees, 270 degrees, and 330 degrees, signals of |1/2A|, |A|, |1/2A|, |−1/2A|, |−A| and |−1/2A| will be received, respectively. However, when there is a phase difference of 150 degrees, there is a shift in the phase at which the measurement starts, such that the signal is measured at phases 180 degrees, 240 degrees, 300 degrees, 360 degrees, 420 degrees, and 480 degrees, sign of $$0, -\frac{\sqrt{2}}{2}A, -\frac{\sqrt{2}}{2}A, 0, \frac{\sqrt{2}}{2}A \text{ and } \frac{\sqrt{2}}{2}A$$

are received, respectively.

It can be seen from the above example that due to the delay in the phase at which the measurement starts as a result of said phase difference, the results of signal measurement are completely different. Regardless of whether the signal is a sinusoidal or square wave (e.g. PWM), similar difference exists.

In addition, each time the driving signal is provided, it can be provided to a plurality of adjacent driving electrodes, wherein the driving electrodes are arranged in sequence and parallel to each other. In a preferred example of the present invention, the driving signal is provided to two adjacent driving electrodes. As a result, in each scan, n electrodes are provided with the driving signal n−1 times, wherein a set of driving electrodes are driven each time. For example, the first and the second driving electrodes are driven first, and subsequently the second and the third driving electrodes are driven, and so on. As described before, each time the driving signal is provided, the number of the set of driving electrodes being driven can be one, two or more. The present invention does not limit the number of driving electrodes that can be driven each time. Each time the driving signal is provided, signals measured from all of the sensing electrodes are combined together to form a 1D sensing information, and all of the 1D sensing information in one scan are combined to constitute a 2D sensing information, which is regarded herein like an image.

Accordingly, in a first embodiment of best modes of the present invention, different phase differences are employed for different electrodes to delay the detected signals. For example, a plurality of phase differences are first determined, and when each set of driving electrodes are provided with the driving signal, one or more signals are measured based on each phase difference. Among the measured signals, the phase difference on which the largest signal is based will be closest to the phase difference between the signal before being provided to the driving electrode(s) and the signal received by the sensing electrode; this phase difference is hereinafter referred to as the closest phase difference. Said signal measuring can be performed by selecting and measuring just one of the sensing electrodes based on each phase difference, or selecting and measuring a plurality or all of the sensing electrodes based on each phase difference, and then the closest phase difference is determined based on the sum of signals of the plurality or all of the sensing electrodes. According to the above, a closest phase difference can be determined for each set of driving electrodes. In other words, when each set of electrodes is driven by a driving signal, all of the sensing electrodes are provided with a driving signal with a delay of the closest phase difference before being measured.

Moreover, a signal can be measured not necessarily based on all the phase differences. A signal can be measured using one of the plurality of phase differences until the measured signal is found to start to decrease after increasing, wherein the phase difference on which the largest signal is based will be the closest phase difference. As such, an image having larger signals can be obtained.

Alternatively, a set of driving electrodes can be first selected as basis electrodes, while the rest of the electrodes are non-basis electrodes. The closest phase difference of the basis electrodes is first determined as a levelized phase difference, and then the phase difference of the non-basis electrodes that is closest to the levelized phase difference is detected, this phase difference is called the most levelized phase difference. For example, a signal measured based on the levelized phase difference of the basis electrodes is regarded as a levelized signal, and a signal is measured based on each phase difference of each set of non-basis driving electrode, and the phase difference upon which the signal closest to the levelized signal among all the measured signals is regarded as the levelized phase difference of the driving electrodes being provided with the driving signal. As a result, the levelized phase difference of each set of driving electrodes can be determined, and the levelized phase difference of each set of driving electrodes is used to delay measuring of subsequent signals, thereby obtaining a more levelized image, that is, differences between signals in the image will be very small. In addition, the levelized signal can fall within a predetermined working range, it does not have to be the optimum or the largest signal.

In the above descriptions, each time the driving signal is provided, all the sensing electrodes use the same phase difference. One with ordinary skill in the art can appreciate that each time the driving signal is provided, each set of sensing electrodes may also use its own closest phase difference or levelized phase difference. In other words, each time the driving signal is provided, a signal is measured based on each phase difference of each set of sensing electrodes to determine the closest phase difference or the levelized phase difference.

In fact, in addition to using the phase difference to delay measurement in order to obtain a larger or a more levelized image, a more levelized image can also be obtained by using different amplifying ratios, impedances, or measuring durations.

Accordingly, a signal measuring method for a touch screen is provided by the present invention, as shown in FIG. 10. In step 1010, a touch screen is provided, which includes a plurality of electrodes composed of a plurality of driving electrodes arranged in parallel and a plurality of sensing electrodes arranged in parallel, the driving electrodes and the sensing electrodes intersect one another at a plurality of intersections. In addition, in step 1020, a delay phase difference is determined for each one or set of driving electrodes. Then, in step 1030, a driving signal is sequentially provided to each one or each set of the driving electrodes, and the driving electrode(s) being driven is/are mutual capacitively coupled with the sensing electrodes. Thereafter, in step 1040, each time the driving signal is provided, a signal of at least one of the sensing electrodes being provided with the driving signal is measured after delaying it by the delay phase difference corresponding to the one or set of driving electrodes being provided with the driving signal Accordingly, in a signal measuring device for a touch screen of the present invention, step 1030 above can be carried out by the driving circuit 41. In addition, step 1040 above can be carried out by the detecting circuit 42.

In an example of the present invention, the delay phase difference for each one or each set of the driving electrodes is selected from a plurality of predetermined phase differences, such as a closest phase difference is selected as mentioned before. Each set of driving electrodes means a set of electrodes simultaneously driven by the driving signal during multiple-electrode driving, and can be implemented by the driving selecting circuit 141 of the driving circuit 41. For example, each one or each set of the driving electrodes is sequentially selected as selected electrodes, which can be implemented by the driving circuit 41. Then, a delay phase difference for the selected electrodes is selected from a plurality of predetermined phase difference. When a driving signal is provided to the selected electrodes, the signal measured after being delayed by the delay phase difference is larger than the signals measured after being delayed by other predetermined phase differences, and this can be implemented by the detecting circuit 42. The selected delay phase difference can be stored in the storage circuit 43.

In addition, the levelized phase difference can also be selected. For example, one or a set of driving electrodes can be first selected as the basis electrode(s), while the rest or the other sets of the electrodes are regarded as the non-basis electrodes. This can be carried out by the driving circuit 41. Then, a delay phase difference for the basis electrode(s) is selected from a plurality of predetermined phase differences, wherein when a driving signal is provided to the basis electrode(s), a signal detected with a delay of the delay phase difference is larger than the signals detected with delays of other predetermined phase differences, wherein the delay phase difference of the basis electrode(s) is said levelized phase difference. Thereafter, the signal detected after the basis electrode(s) is delayed by the delay phase difference is/are used as the basis signal, and each one or each set of non-basis electrodes is sequentially selected from the non-basis electrodes as the selected electrode(s), and a delay phase difference, such as the most levelized phase difference described before, is selected from the plurality of predetermined phase differences for the selected electrode(s), wherein when the driving signal is provided to the selected electrode(s), a signal measured after delaying by the delay phase difference is closest to the basis signal than signals measured after delaying by other predetermined phase differences. These can be implemented using the detecting circuit 42.

In an example of the present invention, when the driving signal is provided to the basis electrode(s) or the selected electrode(s), the signals measured from several of the sensing electrodes are the signals measured from one of the sensing electrodes. In other words, the delay phase difference is chosen based on the signals of the same sensing electrode. In another example of the present invention, when the driving signal is provided to the basis electrode(s) or the selected electrode(s), the signals measured from several of the sensing electrodes are the sum of signals measured from at least two of the sensing electrodes. In other words, the delay phase difference is chosen based on the sum of the signals of the same plurality or all of the sensing electrodes.

As described before, there can be a corresponding delay phase difference for each intersection between each one or each set of driving electrodes and each sensing electrode. In the following descriptions, each or each set of driving electrodes and each or each set of the intersected sensing electrodes are regarded as a detecting combination. In other words, the driving signal can be simultaneously provided to one or a plurality of the driving electrodes, and signals can be measured from one or a plurality of the sensing electrodes. When a signal is produced from measurement, the one or more driving electrodes provided with the driving signal and the measured one or more sensing electrodes are called the detecting combination. For example, in single- or multiple-electrode driving, a signal value is measured from one electrode, or a difference is measured from two electrodes, or a dual difference is measured from three electrodes, wherein the difference is the difference between two adjacent electrodes, and the dual difference is the difference between the difference of the signals of the first two electrodes subtracted by the difference of the signals of the latter two electrodes.

Accordingly, in another example of the present invention, a signal measuring method for a touch screen is provided as shown in FIG. 11. In step 1110, a touch screen is provided, which includes a plurality of electrodes composed of a plurality of driving electrodes arranged in parallel and a plurality of sensing electrodes arranged in parallel, the driving electrodes and the sensing electrodes intersect one another at a plurality of intersections. In addition, in step 1120, each one or each set of the driving electrodes and each intersected one or set of sensing electrodes are regarded as a detecting combination. In step 1130, a delay phase difference is determined for each detecting combination. Thereafter, in step 1140, a driving signal is sequentially provided to each one or each set of the driving electrodes, and the driving electrode(s) provided with the driving signal in the detecting combination provided with the driving signal is/are mutual capacitively coupled with the intersecting sensing electrode(s). Thereafter, in step 1150, each time the driving signal is provided, the signal for each detecting combination provided with the driving signal is measured after being delayed by the corresponding phase difference before.

Accordingly, in a signal detecting device for a touch screen of the present invention, step 1140 can be carried out by the driving circuit 41. In addition, step 1150 can be carried out by the detecting circuit 42.

In an example of the present invention, step 1130 may include: sequentially selecting each one of the detecting combinations as the selected detecting combination, which can be implemented by the driving circuit 41; and selecting a delay phase difference from a plurality of predetermined phase differences for the selected detecting combination, wherein when the driving signal is provided to the selected detecting combination, the signal measured after being delayed with the delay phase difference is larger than the signals measured after being delayed with other predetermined phase differences, this can be implemented by the detecting circuit 42.

In another example of the present invention, determining a delay phase difference for each detecting combination can be implemented as follows. One of the detecting combinations is selected as a basis detecting combination, while the rest of the detecting combinations are non-basis detecting combinations, and one of the non-basis detecting combinations is selected as the selected detecting combination, this can be implemented by the driving circuit 41. In addition, a delay phase difference for the basis detecting combination is selected from a plurality of predetermined phase differences, the signal detected after being delayed by the delay phase difference is larger than the signals detected after being delayed by other predetermined phase differences, and this signal detected after being delayed by the delay phase difference is regarded as a basis signal. Furthermore, a delay phase difference for the selected detecting combination is selected from the plurality of predetermined phase differences, wherein when a driving signal is provided to the selected detecting combination, the signal detected after being delayed by the delay phase difference is closest to the basis signal than the signals detected after being delayed by other predetermined phase differences. The above can be implemented by the detecting circuit 42.

In a second embodiment of the present invention, signals are measured by a control circuit. The signal of each set of sensing electrodes is first passed through a variable resistor before being measured. The control circuit determines the impedance of the variable resistor based on each set of the driving electrodes. For example, a set of driving electrodes is selected as basis electrodes, while the rest of the electrodes are regarded as non-basis electrodes. A plurality of predetermined impedances are set in advance, and a signal of one sensing electrode or a sum of signals of some or all of the sensing electrodes is detected when the basis electrodes (which may be one or more) is/are provided with the driving signal, and used as a levelized signal. In addition, the levelized signal can fall within a predetermined working range; it does not need to be the optimum or the largest signal. In other words, any predetermined impedance that allows the levelized signal to fall within a predetermined working range can be used as levelized impedance for the basis electrodes. Next, when each set of the non-basis electrodes is provided with the driving signal, a signal of the one sensing electrode or a sum of signals of some or all of the sensing electrodes is detected when the variable resistor is adjusted based on each predetermined impedance, so as to find a predetermined impedance that yields a signal closest to the levelized signal. This predetermined impedance is used as levelized impedance for that set of non-basis electrodes being provided with the driving signal. As such, the levelized impedance can be determined for each set of the driving electrodes, and the impedance of the variable resistor can be adjusted based on the levelized impedance for each set of the driving electrodes (adjusting the variable resistor to the levelized impedance), thereby obtaining a more levelized image, that is, the differences between the signals in the image are very small.

In the above descriptions, each time the driving signal is provided, all the sensing electrodes use the same levelized impedance. One with ordinary skill in the art can appreciate that, each time the driving signal is provided, each set of sensing electrodes may also use its own levelized impedance. In other words, each time the driving signal is provided, a signal is measured based on each predetermined impedance for each set of sensing electrodes to determine a predetermined impedance that yields a signal that is closest to the levelized signal, thereby obtaining a levelized impedance for each sensing electrode when each set of driving electrodes is provided with the driving signal, so that the impedance of a variable resistor electrically coupled to each sensing electrode can be adjusted individually.

The above control circuit can be formed not only from electronic elements, but also from one or more IC chips. In an example of the present invention, the variable resistors are built inside the IC chip, and their impedances can be controlled by a program (e.g. firmware inside the IC chip). For example, a variable resistor may consist of several resistors controlled by several switches. By turning on or off different switches, the impedance of the variable resistor can be adjusted. Since the variable resistors and such program are well-known in the art, they will not be further described herein. The program for controlling the variable resistors in the IC chip can be altered through firmware modifications in order to accommodate touch panels with different characteristics, thereby effectively reducing cost and achieving commercial mass production.

In a third embodiment of the present invention, signals are measured by a control circuit. The signal of each set of sensing electrodes is first passed through a measuring circuit (e.g. an integrator) before being measured. The control circuit determines the amplifying ratio of the measuring circuit based on each set of the driving electrodes. For example, a set of driving electrodes is selected as basis electrodes, while the rest of the electrodes are regarded as non-basis electrodes. A plurality of predetermined amplifying ratios are set, and a signal of one sensing electrode or a sum of signals of some or all of the sensing electrodes is detected when the basis electrodes (which may be one or more) is/are provided with the driving signal, and used as a levelized signal. In addition, the levelized signal can fall within a predetermined working range; it does not need to be the best or the largest signal. In other words, any predetermined amplifying ratio that allows the levelized signal to fall within a predetermined working range can be used as a levelized amplifying ratio for the basis electrodes. Next, when each set of the non-basis electrodes are provided with the driving signal, a signal of the one sensing electrode or a sum of signals of some or all of the sensing electrodes is detected when the measuring circuit is adjusted based on each predetermined amplifying ratio, so as to find a predetermined amplifying ratio that yields a signal closest to the levelized signal. This predetermined amplifying ratio is used as a levelized amplifying ratio for that set of non-basis electrodes being provided with the driving signal. As such, a levelized amplifying ratio can be determined for each set of the driving electrodes, and the amplifying ratio of the measuring circuit can be adjusted based on the levelized amplifying ratio for each set of the driving electrodes, thereby obtaining a more levelized image, that is, the differences between the signals in the image are very small.

In the above descriptions, each time the driving signal is provided, all the sensing electrodes use the same levelized amplifying ratio. One with ordinary skill in the art can appreciate that when each time the driving signal is provided, each set of sensing electrodes may also use its own levelized amplifying ratio. In other words, each time the driving signal is provided, a signal is measured based on each predetermined amplifying ratio for each set of sensing electrodes to determine the predetermined amplifying ratio that yields a signal that is closest to the levelized signal, thereby obtaining a levelized amplifying ratio for each sensing electrode when each set of driving electrodes is provided with the driving signal.

In a fourth embodiment of the present invention, signals are measured by a control circuit. The signal of each set of sensing electrodes is first passed through a measuring circuit (e.g. an integrator) before being measured. The control circuit determines the measuring duration of the measuring circuit based on each set of the driving electrodes. For example, a set of driving electrodes is selected as basis electrodes, while the rest of the electrodes are regarded as non-basis electrodes. A plurality of predetermined measuring durations are set, and a signal of one sensing electrode or a sum of signals of some or all of the sensing electrodes is detected when the basis electrodes (may be one or more) is/are provided with the driving signal, and used as a levelized signal. In addition, the levelized signal can fall within a predetermined working range; it does not need to be the best or the largest signal. In other words, any predetermined measuring duration that allows the levelized signal to fall within a predetermined working range can be used as a levelized measuring duration of the basis electrodes. Next, when each set of the non-basis electrodes are provided with the driving signal, a signal of the one sensing electrode or a sum of signals of some or all of the sensing electrodes is detected when the measuring circuit is adjusted based on each predetermined measuring duration, so as to find a predetermined measuring duration that yields a signal closest to the levelized signal. This predetermined measuring duration is used as a levelized measuring duration for that set of non-basis electrodes being provided with the driving signal. As such, a levelized measuring duration can be determined for each set of the driving electrodes, and the measuring duration of the measuring circuit can be adjusted based on the levelized measuring duration for each set of the driving electrodes, thereby obtaining a more levelized image, that is, the differences between the signals in the image are very small.

In the above descriptions, each time the driving signal is provided, all the sensing electrodes use the same levelized measuring duration. One with ordinary skill in the art can appreciate that when each time the driving signal is provided, each set of sensing electrodes may also use its own levelized measuring duration. In other words, each time the driving signal is provided, a signal is measured based on each predetermined measuring duration for each set of sensing electrodes to determine the predetermined measuring duration that yields a signal that is closest to the levelized signal, thereby obtaining a levelized measuring duration for each sensing electrode when each set of driving electrodes is provided with the driving signal.

In the above descriptions, one or a combination of the first embodiment, the second embodiment, the third embodiment, and the fourth embodiment can be selected, and the present invention does not limit the selection. In addition, when measuring a levelized signal, one or several sensing electrode(s) furthest from the measuring circuit can be used for determining the levelized signal. For example, the furthest sensing electrode can be used to determine the levelized signal; a differential signal (a differential value) of the two furthest sensing electrodes can be used to determine the levelized signal; or the difference (a dual differential value) between differential signals of the first two and the last two sensing electrodes in the furthest three sensing electrodes can be used to determine the levelized signal. In other words, the levelized signal may be a signal value, a differential value, a dual differential value, or other value(s) generated from the signal(s) of one or more sensing electrodes.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A signal measuring method for a touch screen comprising:
    determining a delay phase difference for each one or each set of a plurality of driving electrodes of a touch screen comprising a plurality of detecting electrodes, wherein the delay phase difference is a phase difference between a mutual capacitive coupling signal outputted from each one of the plurality of detecting electrodes and a driving signal inputted to said each one or each set of the plurality of driving electrodes; and
    delaying a mutual capacitive coupling detection of all of the plurality of detecting electrodes for the delay phase difference when the driving signal is inputted to said each one or each set of the plurality of driving electrodes.

2. The signal measuring method of claim 1, wherein determining a delay phase difference for each one or each set of the plurality of driving electrodes includes:
    sequentially selecting each one or each set of the plurality of driving electrodes as selected electrodes; and
    selecting a delay phase difference for the selected electrodes from a plurality of predetermined phase differences, wherein when the driving signal is provided to the selected electrodes, the signal measured after delaying by the delay phase difference is larger than the signals measured after delaying by other predetermined phase differences.

3. The signal measuring method of claim 2, wherein when the driving signal is provided to the selected electrodes, the signal measured from a plurality of the detecting electrodes is the sum of the signals measured from one of the plurality of detecting electrodes.

4. The signal measuring method of claim 2, wherein when the driving signal is provided to the selected electrodes, the signal measured from a plurality of the detecting electrodes is the sum of the signals measured from at least two of the plurality of detecting electrodes.

5. The signal measuring method of claim 1, wherein determining a delay phase difference for each one or each set of the plurality of driving electrodes includes:
    selecting one or a set of the plurality of driving electrodes as basis electrodes and the other of the plurality of driving electrodes or the other sets of the plurality of driving electrodes as non-basis electrodes;
    selecting a delay phase difference for the basis electrodes from a plurality of predetermined phase differences, wherein when the driving signal is provided to the basis electrodes, the signal measured after delaying by the delay phase difference is larger than the signals measured after delaying by other predetermined phase differences;
    using the signal measured for the basis electrodes after delaying by the delay phase difference as a basis signal;
    sequentially selecting each one or each set of the non-basis electrodes as selected electrodes; and
    selecting a delay phase difference for the selected electrodes from the plurality of predetermined phase differences, wherein when the driving signal is provided to the selected electrodes, the signal measured after delaying by the delay phase difference is closest to the basis signal than the signals measured after delaying by other predetermined phase differences.

6. The signal measuring method of claim 5, wherein when the driving signal is provided to the basis electrodes or the selected electrodes, the signal measured from a plurality of the detecting electrodes is the sum of the signals measured from one of the plurality of detecting electrodes.

7. The signal measuring method of claim 5, wherein when the driving signal is provided to the basis electrodes or the selected electrodes, the signal measured from a plurality of the detecting electrodes is the sum of the signals measured from at least two of the plurality of detecting electrodes.

8. A signal measuring method for a touch screen comprising:
    regarding each one or each set of a plurality of driving electrodes and each intersecting one or a set of a plurality of detecting electrodes of a touch screen as a detecting combination, wherein the delay phase difference is a phase difference between a mutual capacitive coupling signal outputted from each one of the plurality of detecting electrodes and a driving signal inputted to said each one or each set of the plurality of driving electrodes;
    determining a delay phase difference for each detecting combination; and
    delaying a mutual capacitive coupling detection of all of the plurality of detecting electrodes for the delay phase difference when the driving signal is inputted to said each one or each set of the plurality of driving electrodes.

9. The signal measuring method of claim 8, wherein determining a delay phase difference for each detecting combination includes:
    sequentially selecting each one of the detecting combinations as a selected detecting combination; and
    selecting a delay phase difference for the selected detecting combination from a plurality of predetermined phase differences, wherein when the driving signal is provided to the selected detecting combination, the signal measured after delaying by the delay phase difference is larger than the signals measured after delaying by other predetermined phase differences.

10. The signal measuring method of claim 8, wherein determining a delay phase difference for each detecting combination includes:
    selecting one of the detecting combinations as a selected detecting combination, and the other detecting combinations as non-basis detecting combinations;
    selecting a delay phase difference for the basis detecting combination from a plurality of predetermined phase differences, wherein when the driving signal is provided to the basis detecting combination, the signal measured after delaying by the delay phase difference is larger than the signals measured after delaying by other predetermined phase differences;

using the signal measured for the basis detecting combination after delaying by the delay phase difference as a basis signal;

sequentially selecting each one of the non-basis detecting combinations as a selected detecting combination; and selecting a delay phase difference for the selected detecting combination from the plurality of predetermined phase differences, wherein when the driving signal is provided to the selected detecting combination, the signal measured after delaying by the delay phase difference is closest to the basis signal than the signals measured after delaying by other predetermined phase differences.

11. A signal measuring device for a touch screen comprising:

a touch screen including a plurality of electrodes comprising a plurality of driving electrodes arranged in parallel and a plurality of detecting electrodes arranged in parallel, the driving electrodes and the detecting electrodes intersecting one another at a plurality of intersections;

a driving circuit for sequentially providing a driving signal to each one or each set of the plurality of driving electrodes, the plurality of driving electrodes being provided with the driving signal being mutual capacitive coupled with the plurality of detecting electrodes, wherein each one or each set of the plurality of driving electrodes corresponds to a delay phase difference;

a detecting circuit for determining the delay phase difference for each one or each set of the plurality of driving electrodes, and delaying a mutual capacitive coupling detection of all of the plurality of detecting electrodes for the delay phase difference when the driving signal is inputted to said each one or each set of the plurality of driving electrodes, wherein the delay phase difference is a phase difference between a mutual capacitive coupling signal outputted from each one of the plurality of detecting electrodes and a driving signal inputted to said each one or each set of the plurality of driving electrodes.

12. The signal measuring device of claim 11, wherein the driving circuit further sequentially selects each one or each set of the plurality of driving electrodes as selected electrodes, and the detecting circuit further selects a delay phase difference for the selected electrodes from a plurality of predetermined phase differences, wherein when the driving signal is provided to the selected electrodes, the signal measured after delaying by the delay phase difference is larger than the signals measured after delaying by other predetermined phase differences.

13. The signal measuring device of claim 12, wherein when the driving signal is provided to the selected electrodes, the signal measured from a plurality of the detecting electrodes is the sum of the signals measured from one of the plurality of detecting electrodes.

14. The signal measuring device of claim 12, wherein when the driving signal is provided to the selected electrodes, the signal measured from a plurality of the detecting electrodes is the sum of the signals measured from at least two of the plurality of detecting electrodes.

15. The signal measuring device of claim 11, wherein the driving circuit further selects one or a set of the plurality of driving electrodes as basis electrodes and the other of the plurality of driving electrodes or the other sets of the plurality of driving electrodes as non-basis electrodes, and the driving circuit sequentially selects each one or each set of the non-basis electrodes as selected electrodes; the detecting circuit selects a delay phase difference for the basis electrodes from a plurality of predetermined phase differences, wherein when the driving signal is provided to the basis electrodes, the signal measured after delaying by the delay phase difference is larger than the signals measured after delaying by other predetermined phase differences, and the detecting circuit uses the signal measured for the basis electrodes after delaying by the delay phase difference as a basis signal, and selects a delay phase difference for the selected electrodes from the plurality of predetermined phase differences, wherein when the driving signal is provided to the selected electrodes, the signal measured after delaying by the delay phase difference is closest to the basis signal than the signals measured after delaying by other predetermined phase differences.

16. The signal measuring device of claim 15, wherein when the driving signal is provided to the basis electrodes or the selected electrodes, the signal measured from a plurality of the detecting electrodes is the sum of the signals measured from one of the plurality of detecting electrodes.

17. The signal measuring device of claim 15, wherein when the driving signal is provided to the basis electrodes or the selected electrodes, the signal measured from a plurality of the detecting electrodes is the sum of the signals measured from at least two of the plurality of detecting electrodes.

18. A signal measuring device for a touch screen comprising:

a touch screen including a plurality of electrodes comprising a plurality of driving electrodes arranged in parallel and a plurality of detecting electrodes arranged in parallel, the driving electrodes and the detecting electrodes intersecting one another at a plurality of intersections;

a driving circuit for sequentially providing a driving signal to each one or each set of the plurality of driving electrodes, the plurality of driving electrodes being provided with the driving signal in each one of the plurality of detecting combination being provided with the driving signal being mutual capacitive coupled with the intersecting sensing of the plurality of detecting electrodes, wherein each one or each set of the plurality of driving electrodes and each intersecting one or a set of the plurality of detecting electrodes is regarded as a detecting combination, and each detecting combination corresponds to a delay phase difference; and a detecting circuit for determining the delay phase difference for each one or each set of the plurality of driving electrodes, and delaying a mutual capacitive coupling detection of all of the plurality of detecting electrodes for the delay phase difference when the driving signal is inputted to said each one or each set of the plurality of driving electrodes, wherein the delay phase difference is a phase difference between a mutual capacitive coupling signal outputted from each one of the plurality of detecting electrodes and a driving signal inputted to said each one or each set of the plurality of driving electrodes.

19. The signal measuring device of claim 18, wherein the driving circuit sequentially selects each one of the detecting combinations as a selected detecting combination, and the detecting circuit selects a delay phase difference for the selected detecting combination from a plurality of predetermined phase differences, wherein when the driving signal is provided to the selected detecting combination, the signal measured after delaying by the delay phase difference is larger than the signals measured after delaying by other predetermined phase differences.

20. The signal measuring device of claim 18, wherein the driving circuit selects one of the detecting combinations as a basis detecting combination, and the other detecting combinations as non-basis detecting combinations, and the driving circuit sequentially selects each one of the detecting combinations as a selected detecting combination; and the detecting circuit selects a delay phase difference for the basis detecting combination from a plurality of predetermined phase differences, wherein when the driving signal is provided to the basis detecting combination, the signal measured after delaying by the delay phase difference is larger than the signals measured after delaying by other predetermined phase differences, and the detecting circuit uses the signal measured for the basis detecting combination after delaying by the delay phase difference as a basis signal, and selects a delay phase difference for the selected detecting combination from the plurality of predetermined phase differences, wherein when the driving signal is provided to the selected detecting combination, the signal measured after delaying by the delay phase difference is closest to the basis signal than the signals measured after delaying by other predetermined phase differences.

* * * * *